(12) United States Patent
Wang et al.

(10) Patent No.: US 10,944,329 B2
(45) Date of Patent: Mar. 9, 2021

(54) POWER CONVERTER TOPOLOGIES AND CONTROL METHODS FOR WIDE INPUT AND OUTPUT VOLTAGE RANGES

(71) Applicant: Queen's University at Kingston, Kingston (CA)

(72) Inventors: Hongliang Wang, Hefei (CN); Yang Chen, Kingston (CA); Yan-Fei Liu, Kingston (CA)

(73) Assignee: Queen's University at Kingston, Kingston (CA)

(*) Notice: Subject to any disclaimer, the term of this patent is extended or adjusted under 35 U.S.C. 154(b) by 0 days.

(21) Appl. No.: 16/248,154

(22) Filed: Jan. 15, 2019

(65) Prior Publication Data

US 2019/0222129 A1 Jul. 18, 2019

Related U.S. Application Data

(60) Provisional application No. 62/617,448, filed on Jan. 15, 2018, provisional application No. 62/618,717, filed on Jan. 18, 2018.

(51) Int. Cl.
*H02M 3/335* (2006.01)
*G05F 1/46* (2006.01)
(Continued)

(52) U.S. Cl.
CPC ........ *H02M 3/33576* (2013.01); *G05F 1/462* (2013.01); *H02M 3/285* (2013.01);
(Continued)

(58) Field of Classification Search
CPC ......... H02M 3/335–33592; H02M 2001/0058; H02M 2001/0003; G05F 1/462
See application file for complete search history.

(56) References Cited

U.S. PATENT DOCUMENTS

| | | | | | |
|---|---|---|---|---|---|
| 5,461,297 | A | * | 10/1995 | Crawford | ............... H02M 3/28 320/166 |
| 2009/0323380 | A1 | * | 12/2009 | Harrison | ............. H02M 1/4216 363/126 |

(Continued)

OTHER PUBLICATIONS

Oh, J.S., Lee, G.W., Lee, J.C., Heo, Y.C., Kim, E.S., Cook, Y.S.; "An LLC Resonant Converter with a Balanced Load Sharing Capacitor Operating with a Wide Input / Output Voltage Range"; Nov. 24, 2017; The Korean Institute of Power Electronics; Proceedings of the KIPE Conference 2017; pp. 147-148 (Year: 2017).*

(Continued)

*Primary Examiner* — Thienvu V Tran
*Assistant Examiner* — Shahzeb K Ahmad
(74) *Attorney, Agent, or Firm* — Stephen J. Scribner

(57) ABSTRACT

Resonant converters may be operated according to selected working modes to achieve voltage doubler or non-voltage doubler functions. Embodiments may be based on two-phase resonant converters. Embodiments may implement primary side switching, secondary side switching, or both, to achieve the selected working modes and voltage doubler and non-voltage doubler function. Embodiments are suitable for applications requiring wide input and output voltage ranges, such as low-voltage charging circuits for personal electronic devices, and high voltage charging circuits for electric vehicles.

6 Claims, 15 Drawing Sheets

(51) Int. Cl.
H02M 3/28 (2006.01)
H02M 1/00 (2006.01)
H02M 3/337 (2006.01)

(52) U.S. Cl.
CPC ........ H02M 3/33569 (2013.01); *H02M 3/337* (2013.01); *H02M 2001/0003* (2013.01); *H02M 2001/0058* (2013.01); *H02M 2001/0077* (2013.01)

(56) References Cited

U.S. PATENT DOCUMENTS

| | | | |
|---|---|---|---|
| 2013/0201726 A1* | 8/2013 | Hu | H02M 3/28 363/17 |
| 2015/0180345 A1* | 6/2015 | Frost | H02M 3/3376 363/17 |
| 2015/0229225 A1* | 8/2015 | Jang | H02M 3/285 363/17 |
| 2017/0302179 A1* | 10/2017 | Bandyopadhyay | H02M 1/08 |
| 2018/0248489 A1* | 8/2018 | Wang | H02M 7/217 |
| 2018/0309372 A1* | 10/2018 | Leong | H02M 3/33576 |

OTHER PUBLICATIONS

Yu Gu; Donglai Zhang; Hongyu Zhu; "Multinnode variable structure DC-DC converter for wide input voltage range applications"; Dec. 22, 2016; IEEE; IECON 2016—42nd Annual Conference of the IEEE Industrial Electronics Society; pp. 1382-1387 (Year: 2016).*

* cited by examiner

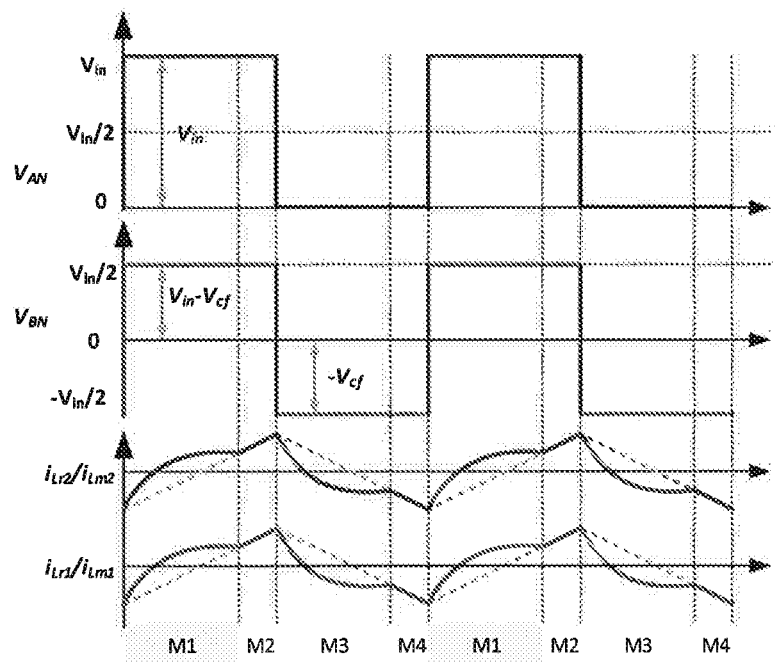
Fig. 3A (a)   Working operation 1 (voltage doubler)
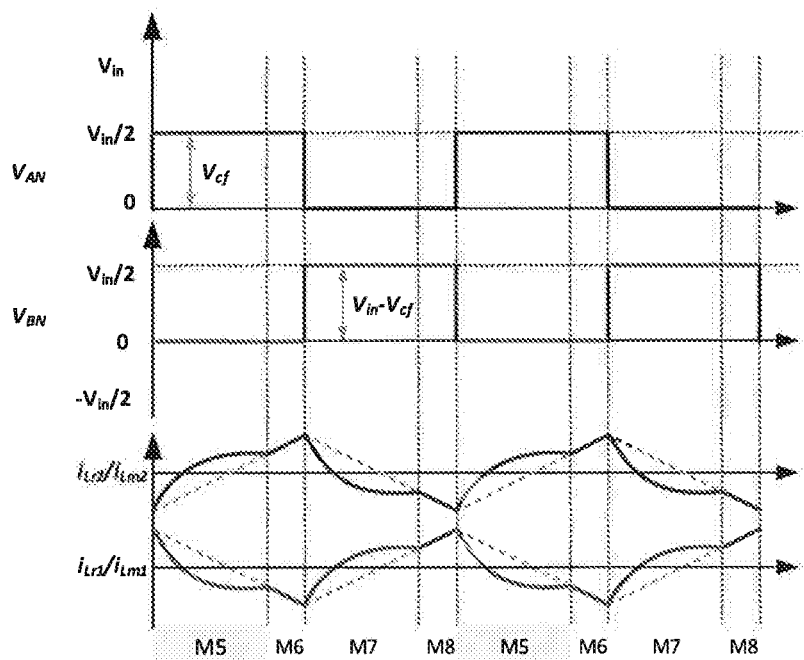
Fig. 3B (b)   Working operation 2 (non-voltage doubler)

POWER CONVERTER TOPOLOGIES AND CONTROL METHODS FOR WIDE INPUT AND OUTPUT VOLTAGE RANGES

RELATED APPLICATIONS

This application claims the benefit of the filing date of Application No. 62/617,448, filed on 15 Jan. 2018, and Application No. 62/618,717, filed on 18 Jan. 2018, the contents of which are incorporated herein by reference in their entirety.

FIELD

This invention relates to power converters for power delivery to electronic devices and electric vehicles. More specifically, the invention relates to circuits and control methods for delivering a wide range of output voltages from a single resonant power converter.

BACKGROUND

Portable electronic devices such as cell phones, tablets, and notebook computers require different input voltages. USB power delivery (USB-PD) compatible power adapters must convert a universal AC voltage to DC voltage and provide an output voltage adjustable from 5V to 20V for such portable devices. The power adapter communicates with the device it is charging and then produces the required output voltage level that matches the need of the device, so that one power adapter can be used for multiple devices.

A resonant converter is suitable to implement such a USB power adapter because of favourable features such as zero-voltage switching (ZVS) and high switching frequency operation, which reduces the overall size of the power adapter. However, in order to achieve 5V to 20V output variation range, the switching frequency of a resonant converter must be changed over wide range (such as more than 3:1 ratio) and as a result the design will not be optimal. If the voltage gain variation range is designed to be very wide, the performance (such as efficiency, power density, etc.) will be degraded.

In addition to the USB-PD application, DC-DC converter applications may require very wide voltage gain variation range. For example, the DC-DC converter of an electric vehicle (EV) power systems may have a 9V to 16V output voltage with 240V to 430V input voltage, with a voltage gain from 0.067 to 0.021, or a variation range of 3.2 times, which is a very challenging requirement for resonant converters. To maintain such a large voltage gain variation range, the design of the resonant converter is compromised and efficiency cannot be optimized.

SUMMARY

Described herein is a resonant converter, comprising: first and second primary side input terminals; at least one primary side resonant circuit; a transformer; at least one secondary side rectifier circuit; output points of the at least one rectifier circuit connected to first and second secondary side output terminals; an output capacitor connected across the first and second output terminals; and at least one controller that controls at least one switch of the resonant converter according to at least two modes; wherein each mode of the at least two modes is associated with a voltage at the first and second output terminals; wherein at least a first selected mode determines a voltage V at the first and second output terminals and at least a second selected mode determines a voltage 2V at the first and second output terminals; wherein a transition in output voltage from voltage V to voltage 2V, or vice versa, occurs substantially without a voltage or current spike.

In one embodiment, the resonant converter comprises first and second primary side resonant circuits; first and second secondary side rectifier circuits; wherein the at least one controller controls switches of the first and second primary side resonant circuits according to a plurality of working modes.

In one embodiment, the resonant converter includes at least five switches associated with the first and second primary side resonant circuits; wherein the at least one controller controls the at least five switches according to eight working modes. In one embodiment, a first four working modes determine the voltage 2V at the first and second output terminals and a second four working modes determine the voltage V at the first and second output terminals.

In one embodiment, the resonant converter comprises first and second primary side resonant circuits; first and second secondary side rectifier circuits; wherein the at least one controller controls switches of the first and second primary side resonant circuits according to a plurality of working modes; and wherein the at least one controller controls at least one switch of the first and second secondary sides according to first and second working modes; wherein the first working mode determines the voltage V at the first and second output terminals and the second working mode determines the voltage 2V at the first and second output terminals.

In one embodiment, the resonant converter comprises first and second secondary side rectifier circuits; a selection circuit connected to the first and second secondary side rectifier circuits, the selection circuit comprising at least one switch; wherein the at least one controller controls the at least one switch of the selection circuit according to first and second working modes; wherein the first working mode determines the voltage V at the first and second output terminals and the second working mode determines the voltage 2V at the first and second output terminals. In one embodiment, the at least one controller controls the selection circuit so that the first and second rectifier circuit output points are connected together in parallel in the first mode and in series in the second mode.

Also described herein is a method for controlling a resonant converter comprising first and second primary side input terminals; at least one primary side resonant circuit; a transformer; at least one secondary side rectifier circuit; output points of the at least one rectifier circuit connected to first and second secondary side output terminals; an output capacitor connected across the first and second output terminals; the method comprising controlling at least one switch of the resonant converter according to at least a first selected mode that determines a voltage V at the first and second output terminals; controlling at least one switch of the resonant converter according to at least a second selected mode that determines a voltage 2V at the first and second output terminals; wherein a transition in output voltage from voltage V to voltage 2V, or vice versa, occurs substantially without a voltage or current spike.

In one embodiment, wherein the resonant converter comprises first and second primary side resonant circuits; and first and second secondary side rectifier circuits; the method comprises controlling switches of the first and second primary side resonant circuits according to a plurality of working modes.

In one embodiment, wherein the first and second primary side resonant circuits include at least five switches; the method comprises controlling the at least five switches according to eight working modes. In one embodiment, the method comprises controlling the at least five switches according to a first four working modes that determine the voltage 2V at the first and second output terminals; and controlling the at least five switches according to a second four working modes determine the voltage V at the first and second output terminals.

In one embodiment, wherein a selection circuit is connected to the first and second rectifier circuits, the selection circuit comprising at least one switch; the method comprises controlling the at least one switch according to a first working mode that determines the voltage V at the first and second output terminals; and controlling the at least one switch according to a second working mode that determines the voltage 2V at the first and second output terminals. In one embodiment, the method comprises controlling the at least one switch so that output points of the first and second rectifier circuits are connected together in parallel in the first mode and in series in the second mode.

In one embodiment, wherein the resonant converter comprises first and second secondary side rectifier circuits; and a selection circuit connected to the first and second rectifier circuits, the selection circuit comprising at least one switch; the method comprises controlling the at least one switch according to a first working mode that determines the voltage V at the first and second output terminals; and controlling the at least one switch according to a second working mode that determines the voltage 2V at the first and second output terminals. In one embodiment, the method comprises controlling the at least one switch so that output points of the first and second rectifier circuits are connected together in parallel in the first mode and in series in the second mode.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 3A and 3B shows waveforms of a first and second working operations, respectively, for the embodiment of FIG. 1.

DETAILED DESCRIPTION OF EMBODIMENTS

Described herein are resonant converter circuits and methods for operating the circuits with wide input and output voltages ranges without sacrificing efficiency and power density.

1. Two-Phase Three-Level Resonant Converter with Voltage Doubler

Figure 1:
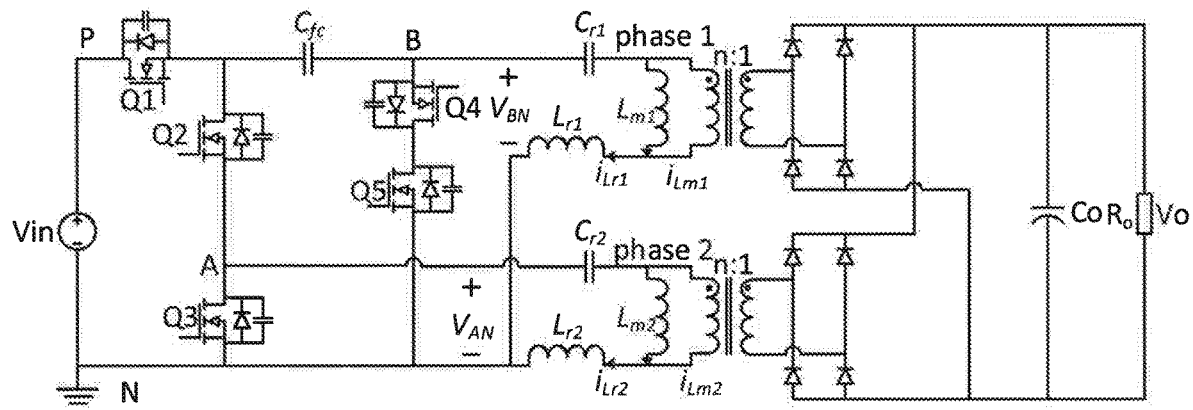
FIG. 1 is a schematic diagram of a two-phase three-level resonant converter with double voltage function, according to one embodiment.

A two-phase three-level resonant converter with a voltage doubler function is described. The voltage gain from output voltage to input voltage may double under different working operations. FIG. 1 shows an embodiment including a flying capacitor Cfc and secondary windings of the two phases connected to full-bridge rectifiers, with the outputs connected in parallel.

In the two-phase embodiment of FIG. 1, two LLC resonant tank circuits are used. The first LLC resonant tank includes a resonant capacitor Cr1, a resonant inductor Lr1, a magnetizing inductor Lm1, and a transformer (phase 1). The second LLC resonant tank includes Cr2, Lr2, Lm2, and a transformer (phase 2). The turns ratio of both transformers is n:1. The input terminals of the first LLC resonant tank are point B and point N. The input terminals of the second LLC resonant tank are point A and point N. Therefore, voltage VAN and VBN are the key to operation of this circuit.

There are eight (8) working modes for this embodiment in which the switching sequence of five switches (Q1, Q2, Q3, Q4, and Q5) is controlled so that the voltage applied to the two LLC resonant tank circuits is different by a factor of two (i.e., two times), so that the output voltage is also different by two times. Therefore, voltage doubler operation is achieved by the primary side switching sequence control. It is assumed that the value of the flying capacitor, Cfc, is large and its voltage ripple is very small. Due to symmetrical operation, the DC value of the capacitor voltage Vcf is Vin/2, or half of the input voltage. The polarity of Vcf is positive at the left side and negative at the right side (point B) in FIG. 1.

The voltage doubler operation is achieved by modes 1, 2, 3, and 4. In voltage doubler operation, the peak to peak voltage applied to the two LLC resonant tanks is the input voltage, Vin.

The non-voltage doubler operation is achieved by modes 5, 6, 7, and 8. In non-voltage doubler operation, the peak to peak voltage applied to the two LLC resonant tanks is half of the input voltage, Vin/2. Therefore, the output voltage will be half as compared with the case in the voltage doubler operation.

The equivalent circuits of the eight working modes are shown in FIGS. 2A-2H. For each mode, the dashed lines with arrows show the actual current flow direction, and the parts of the circuit drawn with dashed lines are not in operation. FIG. 3A shows key waveforms for voltage doubler operation. FIG. 3B shows key waveforms for non-voltage doubler operation.

Figure 2A:
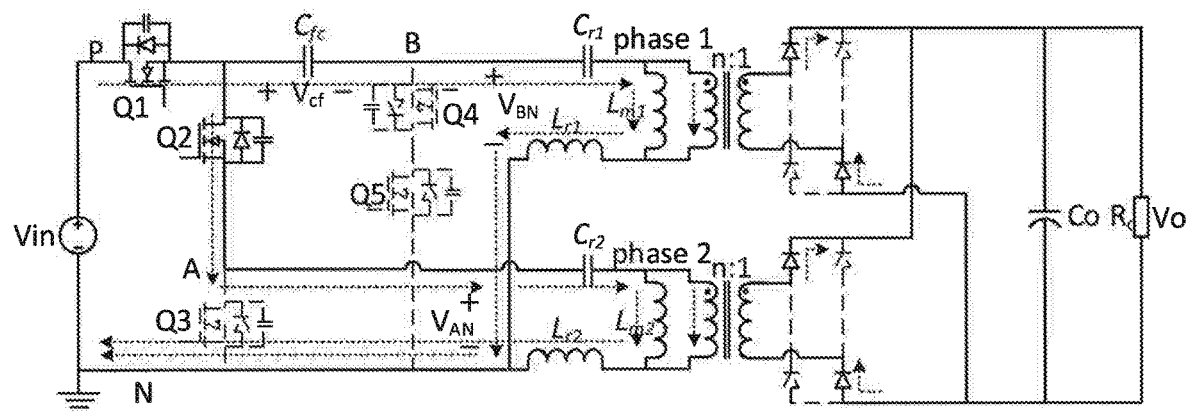
FIGS. 2A-2H are schematic diagrams showing working modes 1-8 for the embodiment of FIG. 1.
Figure 2B:
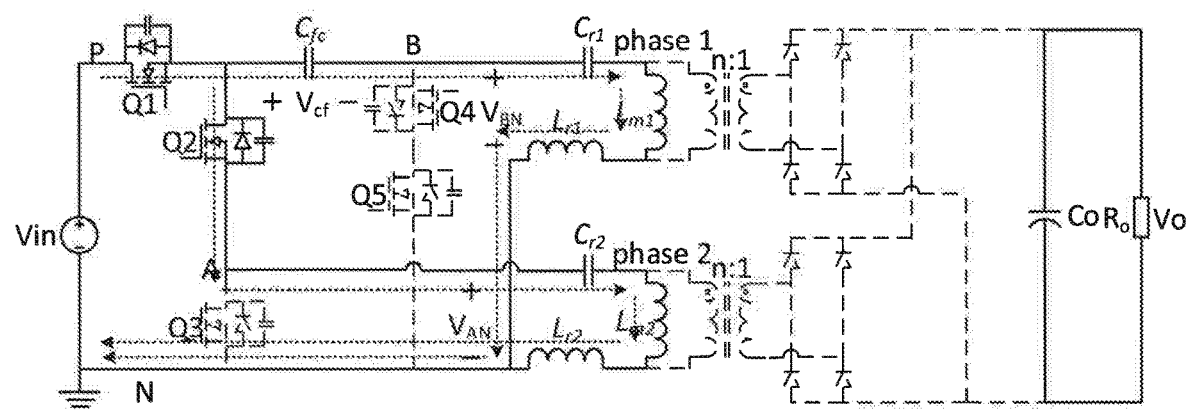

The equivalent circuits of working modes 1 and 2 are shown in In FIGS. 2A and 2B, respectively. During these two modes, the switches Q1 and Q2 are on. Q3, Q4, and Q5 are off.

In mode 1, shown in FIG. 2A, the voltage applied to the first LLC resonant tank is $V_{BN}$=Vin−Vc=Vin/2. The voltage applied to the second LLC resonant tank is $V_{AN}$=Vin. Power is transferred from the power source to resonant tank. Working mode 1 ends when the resonant current Ir1 becomes less than the magnetizing inductor current, ILm1. Power is transferred to the output side, Vo.

In mode 2, shown in FIG. 2B, no power is transmitted from the primary side to the secondary side. When the resonant current is equal to the magnetizing current, there is no current on the secondary side, and the primary side of the transformer is isolated from the secondary side. During this time, because the rectifier diodes are turned off, the secondary side load is powered by the output capacitor $C_0$. In each phase the primary side resonant inductor, the resonant capacitor, and the magnetizing inductance form a series resonance.

In modes 1 and 2, the current through Q1 is $I_{r1}+I_{r2}$, and the current through Q2 is $I_{r2}$. The voltage stress of Q3 is Vin, and the voltage stress across Q4 and Q5 is Vin/2. Mode 2 ends at the end of the half switching period.

Figure 2C:
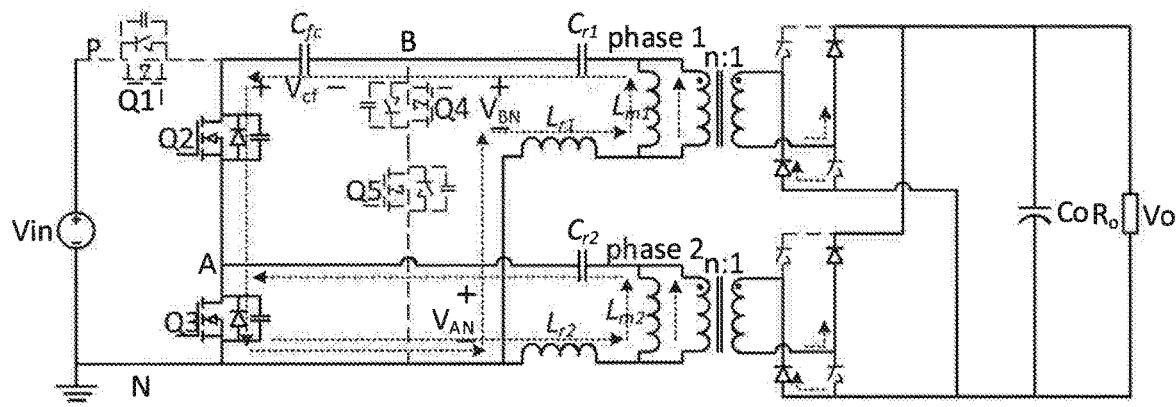
Figure 2D:
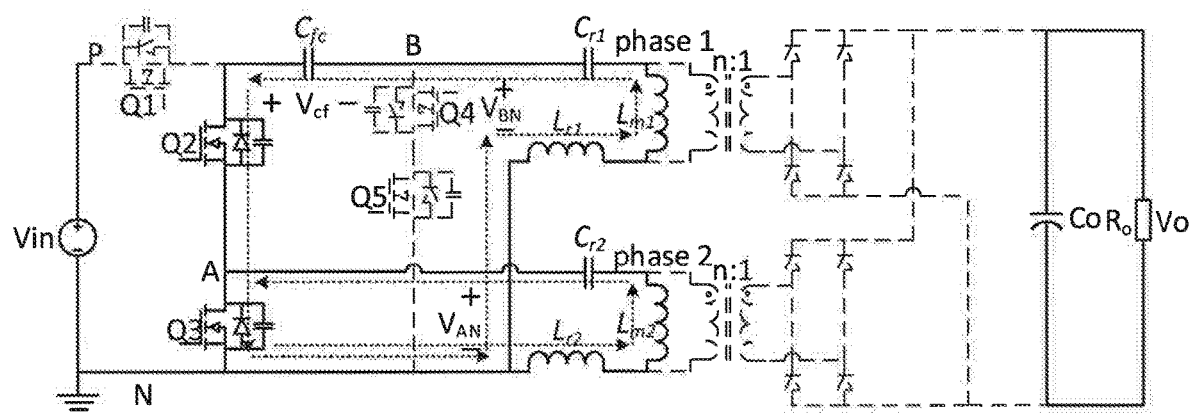

The equivalent circuits of working modes 3 and 4 are shown in FIGS. 2C and 2D, respectively. During these two modes, the switches Q2 and Q3 are on. Q1, Q4, and Q5 are off.

In mode 3, as shown in FIG. 2C, power is transferred from the primary side to the secondary side. For phase 1, the current loops through Cfc and Q2, Q3 and the resonant inductor $L_{r1}$, the resonant capacitor $C_{r1}$, and the magnetizing inductance $L_{m1}$. VBN=−Vcf=−Vin/2. In this mode, the capacitor Cfc releases energy. The primary side voltage is clamped by the secondary side voltage, and the magnetizing inductance $L_{m1}$ does not participate in the resonance. For phase 2, VAN=0, the current flows through the resonant capacitor $C_{r2}$, the magnetizing inductance $L_{m2}$, the resonant inductor $L_{r2}$, and Q3 in a loop, and the energy is transmitted to the load side. Similarly, the primary side voltage is clamped by the load side voltage, resulting in only the resonant inductor $L_{r2}$ and the resonant capacitor $C_{r2}$ participating in the resonance. Mode 3 ends when the resonant current becomes less than the magnetizing inductor current.

In mode 4, shown in FIG. 2D, no power is transmitted from the primary side to the secondary side. When the resonant current is equal to the magnetizing current, the secondary side is isolated from the primary side, the secondary side has no current, and the rectifier diodes are under zero current shutdown. The load is powered by the output capacitor $C_0$, and the primary side magnetizing inductance is not subjected to the secondary side voltage clamp. In this mode, the magnetizing inductance, resonant inductance, and resonant capacitance participate in series resonance.

In modes 3 and 4, the current through Q2 is $I_{r1}$, and the current flowing through Q3 is $I_{r1}+I_{r2}$. The voltage stress of Q1 is Vin, and the voltage stress of Q4 and Q5 is Vin/2.

Non-voltage doubler operation is achieved with working modes 5, 6, 7, and 8. In modes 5 and 6, shown in FIGS. 2E and 2F, the switches Q2, Q4, Q5 are on. Switches Q1 and Q3 are off.

Figure 2E:
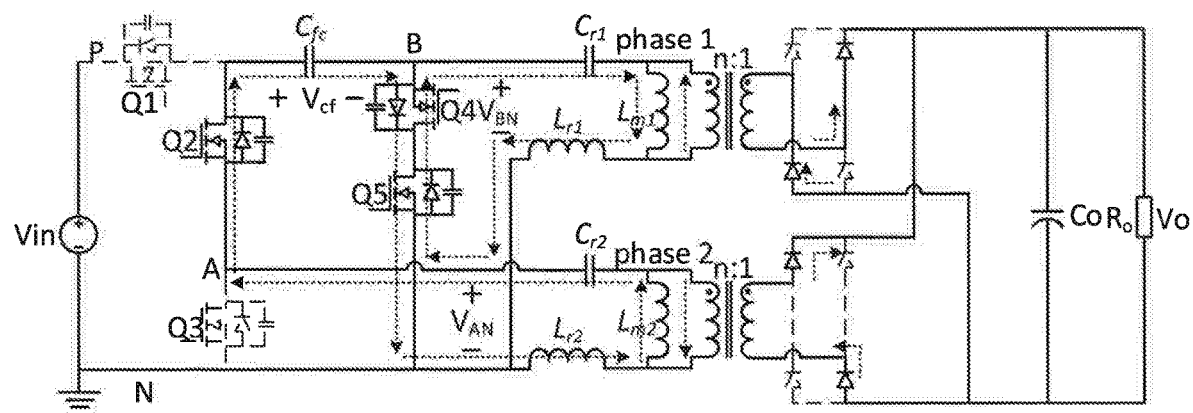

In mode 5, shown in FIG. 2E, the voltage applied to the first LLC resonant tank is VBN=0V since Q4, Q5 are on. Power is transferred from Cfc to the secondary side. In phase 1, current passes through Q4, Q5 (note: two switches, Q4 and Q5, are connected back to back in this embodiment to increase the reliability of the circuit and prevent direct conduction of current in a certain direction) and the resonant inductor $L_{r1}$ and the resonant capacitor $C_{r1}$, magnetizing inductor $L_{m1}$ form a loop. The primary side voltage is clamped by the secondary side voltage, and the magnetizing inductance $L_{m1}$ does not participate in resonance. Only the resonant inductor $L_{r1}$ and the resonant capacitor $C_{r1}$ participate in resonance.

For phase 2, the current forms a loop through the flying capacitor Cfc, the resonant capacitor $C_{r2}$, the magnetizing inductance $L_{m2}$, the resonant inductor $L_{r2}$, and the switches Q2, Q4, and Q5. VAN=Vcf=Vin/2, and energy is transmitted from the primary side to the load side. During this process, the flying capacitor Cfc is discharged. Similarly, the primary side voltage is clamped by the load side and remains unchanged, causing the magnetizing inductance to not participate in the resonance.

Figure 2F:
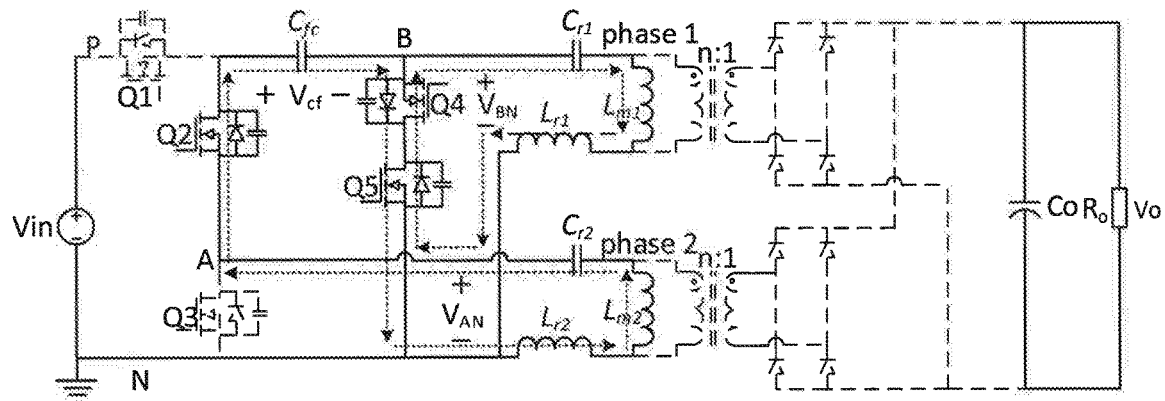

In mode 6, FIG. 2F, no power is transmitted from the primary side to the secondary side. Similarly, when the resonant current is equal to the magnetizing current, energy cannot be transmitted, and the energy is provided to the load by the capacitor $C_0$. The primary side magnetizing inductance is not be affected by the secondary side voltage clamping. In this mode, the magnetizing inductance, resonant inductance, and resonant capacitance of each bridge arm participate in series resonance.

The current through Q2 is $I_{r2}$. The two resonant currents of the phases are opposite, and the sum of currents flowing through Q4 and Q5 remains at zero or negative. The voltage across Q1 is Vin, and the voltage across Q3 is Vin/2.

Figure 2G:
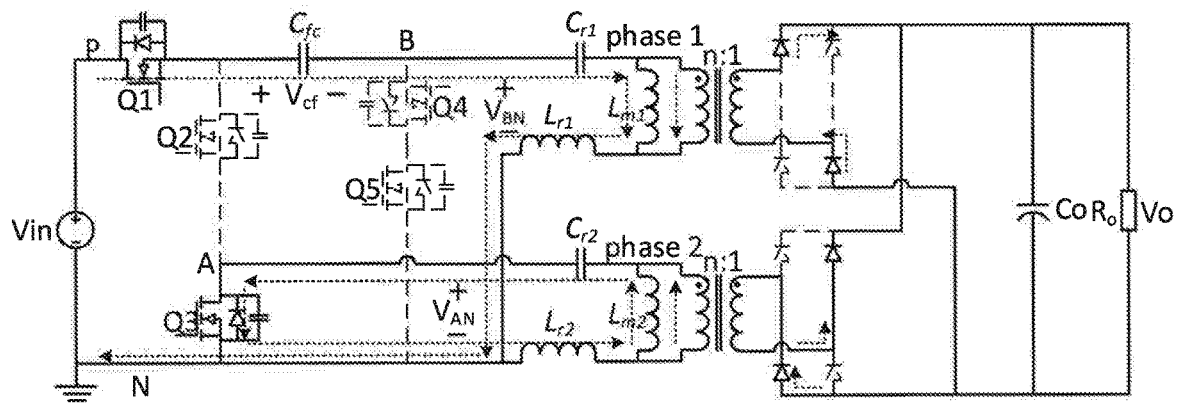
Figure 2H:
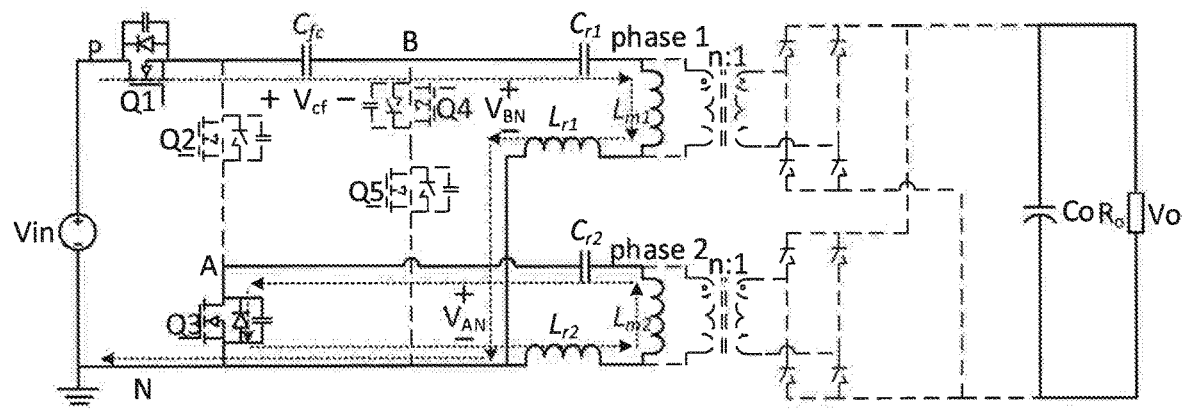

In modes 7 and 8, shown in FIGS. 2G and 2H, switches Q1, Q3 are on. Switches Q2, Q4, and Q5 are off.

In mode 7, shown in FIG. 2G, power is transferred from the primary side to the secondary side. In phase 1, current flows through Q1, Cfc, and resonant inductor $L_{r1}$, resonant capacitor $C_{r1}$, and magnetizing inductance $L_{m1}$ to form a loop. VBN=Vin−Vcf=Vin/2. In this mode, the flying capacitor Cfc absorbs energy by charging from input voltage. The primary side voltage of the transformer of phase 1 is clamped by the secondary side voltage. The resonant inductor $L_{r1}$ and the resonant capacitor $C_{r1}$ participate in resonance. In phase 2, VAN=0, the resonant current forms a loop through the resonant capacitor $C_{r2}$, the magnetizing inductance $I_{m2}$, the resonant inductor $L_{r2}$ and the switch Q3, and energy is transmitted to the load side. The primary side voltage of the transformer in phase 2 is clamped by the load side, causing the magnetizing inductance to not participate in the resonance.

In mode 8, shown in FIG. 2H, there is no power transfer from the primary side to the secondary side. When the resonant current reaches magnetizing current, there is no current on the secondary side, which achieves ZCS turn-off.

The current through Q1 is $I_{r1}$, and the current through Q3 is $I_{r2}$. The voltage stress of Q2 is Vin, and the total voltage stress of Q4 and Q5 is Vin/2.

Table 1 summarizes the voltages, switch states, and flying capacitor state for each mode.

TABLE 1

Mode selection and flying capacitor charge/discharge

| Mode | $V_{AN}$ | $V_{BN}$ | Q1 | Q2 | Q3 | Q4 | Q5 | $C_{fc}$ |
|---|---|---|---|---|---|---|---|---|
| 1, 2 | $V_{in}$ | $V_{in}/2$ | 1 | 1 | 0 | 0 | 0 | Charge |
| 3, 4 | 0 | $-V_{in}/2$ | 0 | 1 | 1 | 0 | 0 | Discharge |
| 5, 6 | $V_{in}/2$ | 0 | 0 | 0 | 1 | 0 | 1 | 1 Discharge |
| 7, 8 | 0 | $V_{in}/2$ | 1 | 0 | 1 | 0 | 0 | Charge |

FIGS. 3A and 3B show two working operations. In FIG. 3A, modes 1, 2, 3, and 4 are selected and the circuit operates as a voltage doubler. The input voltages for the two LLC resonant tanks are VAN=Vin and 0, and VBN=+Vin/2 and −Vin/2. The peak to peak voltage is Vin. The flying capacitor voltage may be balanced according to Table 1.

In the second working operation as shown in FIG. 3B, modes 5, 6, 7, and 8 are selected and the circuit operates as a non-voltage doubler. The bridge voltages of each phase are VAN=Vin/2 and 0, and VBN=0 and Vin/2. The flying capacitor voltage may be balanced according to Table 1.

Therefore, in the working operation of FIG. 3A, the output voltage Vo is twice the output voltage of the working operation of FIG. 3B.

Embodiments may include a controller that controls operation of switches (Q1-Q5) in order to produce and select the working modes. For example, the controller may control operation of the switches according to the switch states shown in Table 1. The controller may be analog or digital and include gate drivers and logic circuitry and be implemented in any suitable technology as known in the art, such as, but not limited to, a field programmable gate array (FPGA).

2. Resonant Converter with Variable Series/Parallel Structure

Figure 16:
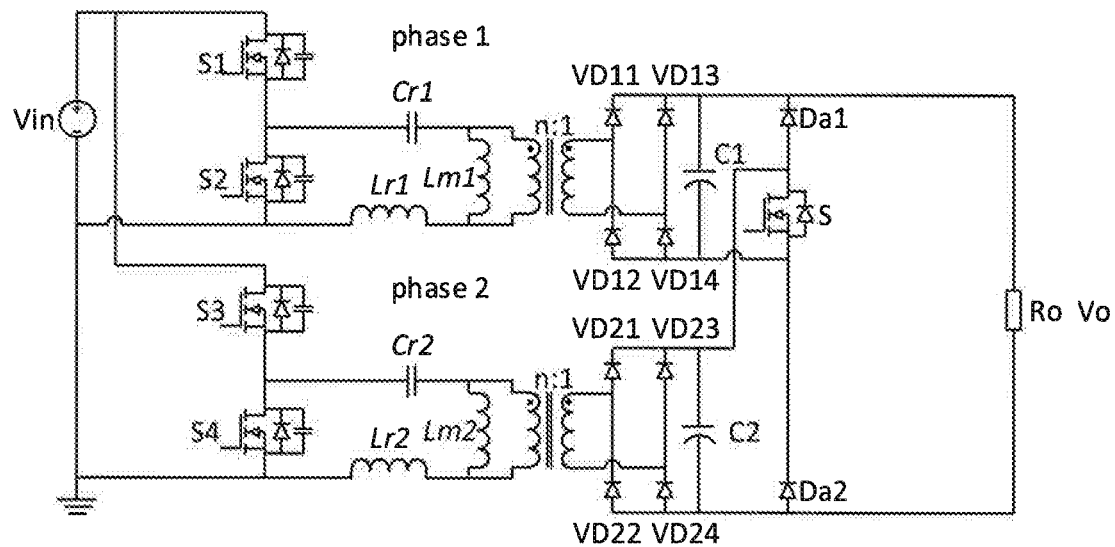
FIG. 16 is a schematic diagram of a two-phase resonant converter, according to the prior art.

For wide input/output voltage range applications, a very high voltage gain is required for a resonant converter. Although variable structures based on series and parallel circuits have been proposed, such as that shown in FIG. 16, they use output capacitors C1 and C2 which are large filter capacitors. According to FIG. 16, when switch S is turned off, C1 and C2 are connected in parallel and there is a large voltage spike due the high current that flows through C1 and C2 during the transition. Therefore, transitions in the output voltage cannot be smoothly controlled as the two voltage equivalent sources are changed between series and parallel. The output voltage is double or half after the transition time.

The embodiments described herein overcome this problem by providing a switching structure, referred to herein as a selection circuit, for selecting parallel or series configurations of the secondary side of a resonant converter, that provides a smooth transition in output voltage while switching between parallel and series configurations. That is, there is no current spike through the output capacitor during the voltage transition. In various embodiments, the selection circuit includes at least one switch, and may include two or more diodes.

A selection circuit as described herein may be used with a resonant converter of any design having two secondary phases. For example, in one embodiment, a selection circuit may be used with the resonant converter of FIG. 1. Other embodiments are shown in FIGS. 4, 8, 9, 11, 14, and 15A-15E. The resonant converters of those embodiments may be operated in non-voltage doubler (V) and voltage doubler (2V) modes. Thus, in accordance with embodiments described herein, addition of a selection circuit provides a further voltage doubler function, such that output voltages may be increased up to 4V, without current or voltage spikes during output voltage transitions. It will be appreciated that such resonant converter embodiments are suitable for demanding applications such as electric vehicle (EV) power systems, which may require a voltage gain of 3 or more (e.g., a voltage gain of 3.2).

An alternative topology of a selection circuit, shown in FIGS. 12A-12C and 13, is suitable for use with resonant converters with single phase center tapped secondary sides.

Figure 4:
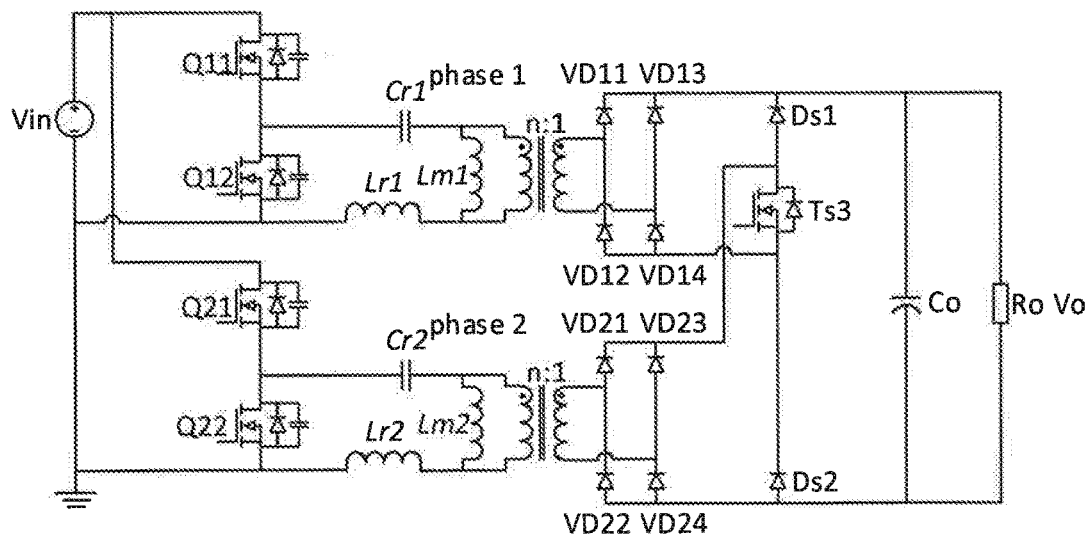
FIG. 4 is a schematic diagram of a two-phase three-level resonant converter with double voltage function, according to one embodiment.
Figure 5:
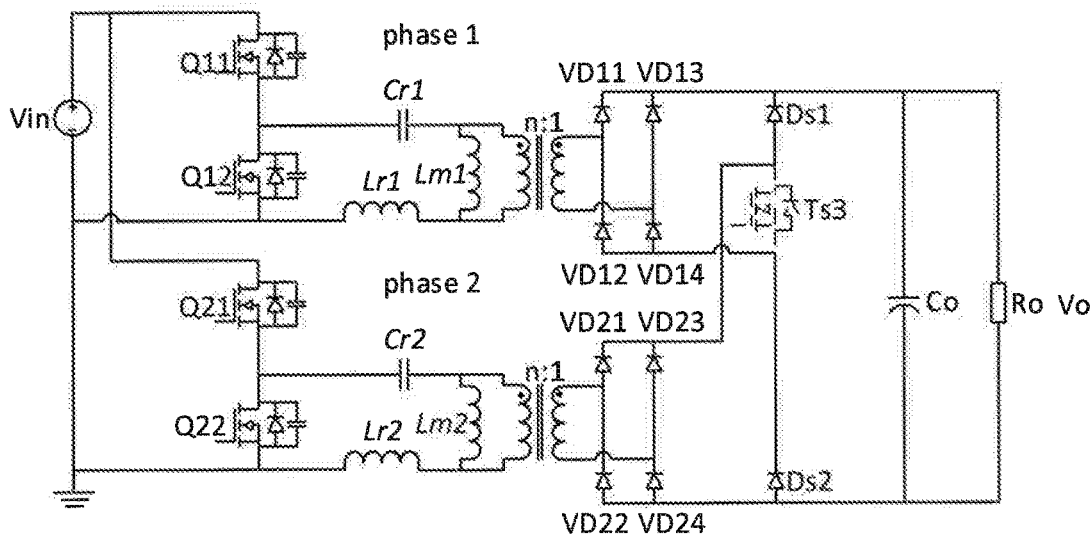
FIG. 5 is a schematic diagram showing the embodiment of FIG. 4 not in voltage doubler mode.
Figure 6:
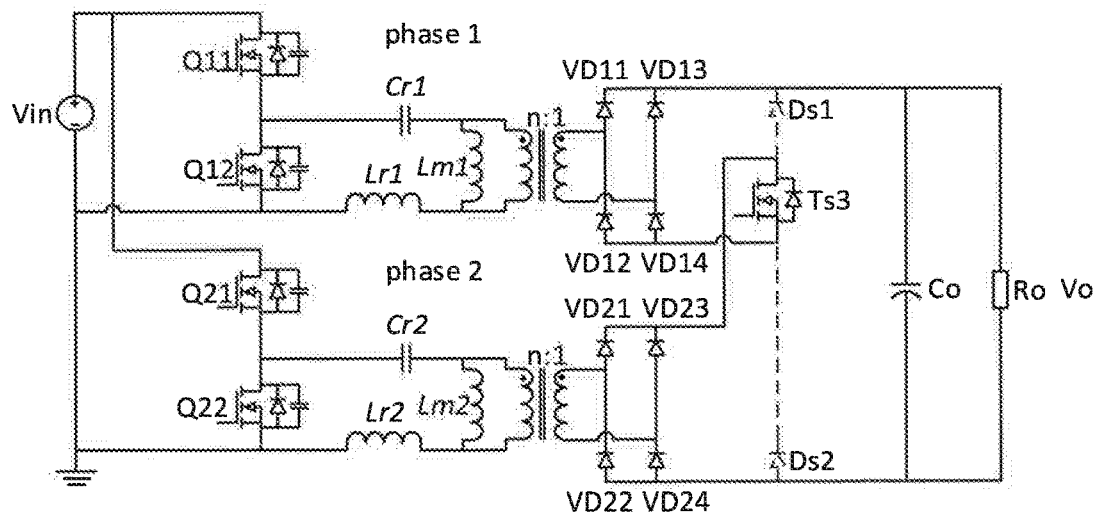
FIG. 6 is a schematic diagram showing the embodiment of FIG. 4 in voltage doubler mode.

FIG. 4 shows an embodiment based on a two-phase resonant converter. As shown in FIG. 4, each resonant converter phase primary side has two switches, a resonant circuit, a magnetizing inductor, and a transformer primary winding. Each resonant converter phase secondary side has a secondary winding and a full-bridge rectifier. According to this embodiment the selection circuit comprises a switch Ts3, and diodes Ds1 and Ds2. The selection circuit is used to change the connection of the secondary sides of the two phases between series and parallel. FIG. 5 shows the embodiment of FIG. 4, wherein the switch Ts3 is off (shown in dashed lines), and the secondary sides of the two-phase resonant converter are connected in parallel (i.e., not in voltage doubler mode). FIG. 6 shows the embodiment of FIG. 4, wherein the switch Ts3 is on and the diodes Ds1 and Ds2 are off (shown in dashed lines), and the secondary sides of the two-phase resonant converter are connected in series (i.e., in voltage doubler mode). It is noted that the two-phase resonant converters operate as current sources and share a common output capacitor Co in both series and parallel secondary side configurations. Thus, the switching operation of the selection circuit provides a smooth transition from series to parallel modes, and vice-versa. A smooth transition means that there is either no voltage or current spike, or only a very small voltage or current spike that may be considered negligible. For example, during the transition when Ts3 is turned on or turned off there is no voltage or current spike.

Referring to the embodiment of FIG. 4, there are eight working modes (A-H) as shown in FIGS. 7A-7H. For each working mode, the dashed lines with arrows show the current flow direction, and the parts of the circuit shown with dashed lines are not in operation. The embodiment may operate according to working modes A-H when the selection circuit is in non-voltage double mode (Ts3 is off), or in voltage doubler mode (Ts3 is on).

Figure 7A:
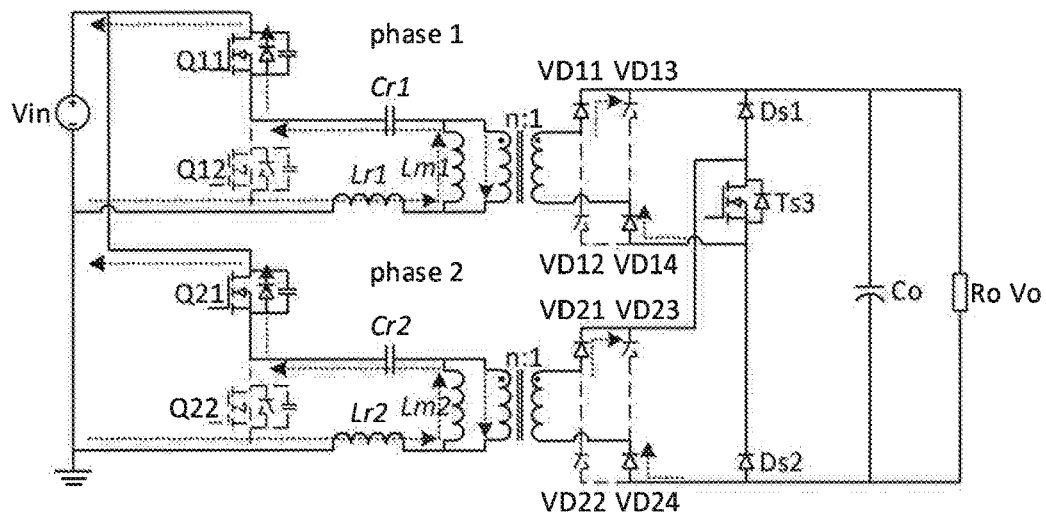
FIGS. 7A-7H are schematic diagrams showing working modes A-H for the embodiment of FIG. 4.

Mode A: As shown in FIG. 7A, Q11 and Q21 are on, and Q12 and Q22 are off. This mode starts when Q11 and Q21 turn on. Q12 and Q22 remain off The drain voltage of Q12 and the drain voltage of Q22 are equal to Vin. The body diode of Q11 and the body diode of Q21 are on as the inductor current $i_{Lr1}$ and $i_{Lr2}$ are negative. The inductor $L_{m1}$ and capacitor $C_{r1}$ form series resonance, the same as the inductor $L_{m2}$ and capacitor $C_{r2}$. The rectifier diodes VD11, VD14, VD21 and VD24 are on to flow rectifier current. This mode ends when $i_{cr1}=0$, $i_{cr2}=0$. Power is transferred from primary side to secondary side.

Figure 7B:
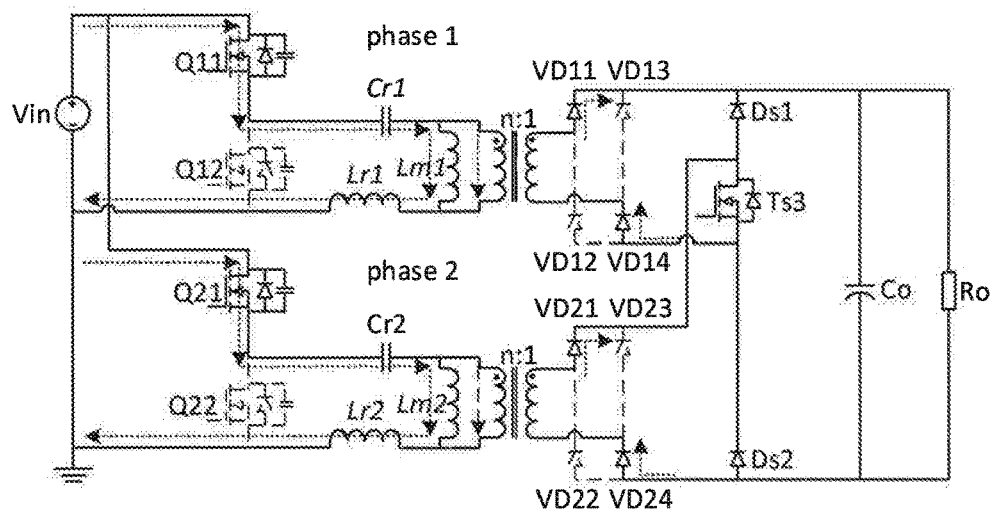

Mode B: As shown in FIG. 7B, Q11 and Q21 are on, and Q12 and Q22 are off. ZVS performance is achieved for the Q11 and Q21. The inductor current $i_{lr1}$ and $i_{lr2}$ become positive. The rectifier diodes VD11, VD14, VD21 and VD24 remain on. The voltage of magnetizing inductors are clamped by output voltage, so the currents in magnetizing inductor $L_{m1}$ and $L_{m2}$ increase. This mode ends when $i_{cr1}=i_{lm1}$, $i_{cr2}=i_{lm2}$.

Figure 7C:
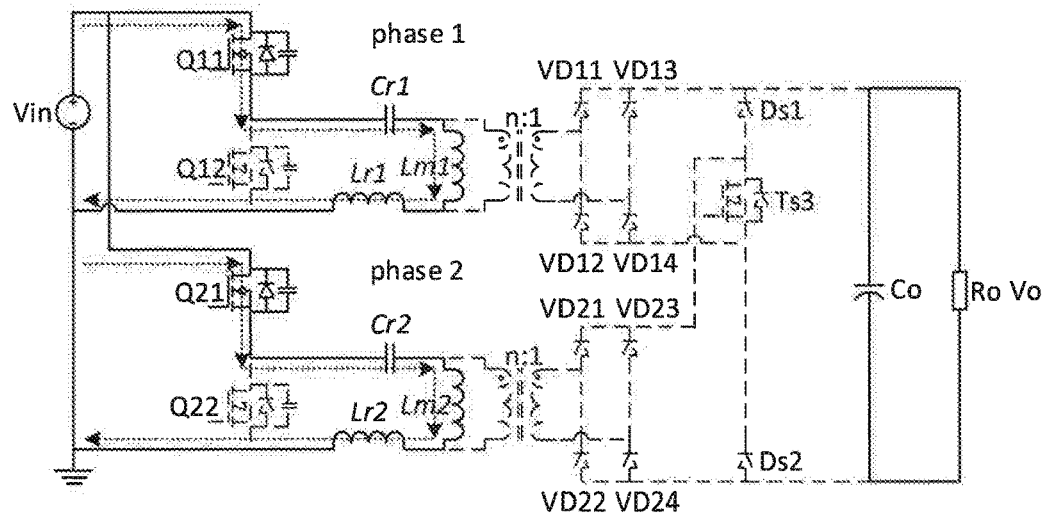

Mode C: As shown in FIG. 7C, Q11 and Q21 are on, and Q12 and Q22 are off. When $i_{cr1}=i_{lm1}$, $i_{cr2}=i_{lm2}$, VD11, VD14, VD21 and VD24 achieve ZCS performance. There is no power transferred from primary side to secondary side, and the load is powered by Co discharging. The voltages of the magnetizing inductors are no longer clamped by output voltage. The resonant current flows into magnetizing inductor $L_{m1}$ and magnetizing inductor $L_{m2}$.

Figure 7D:
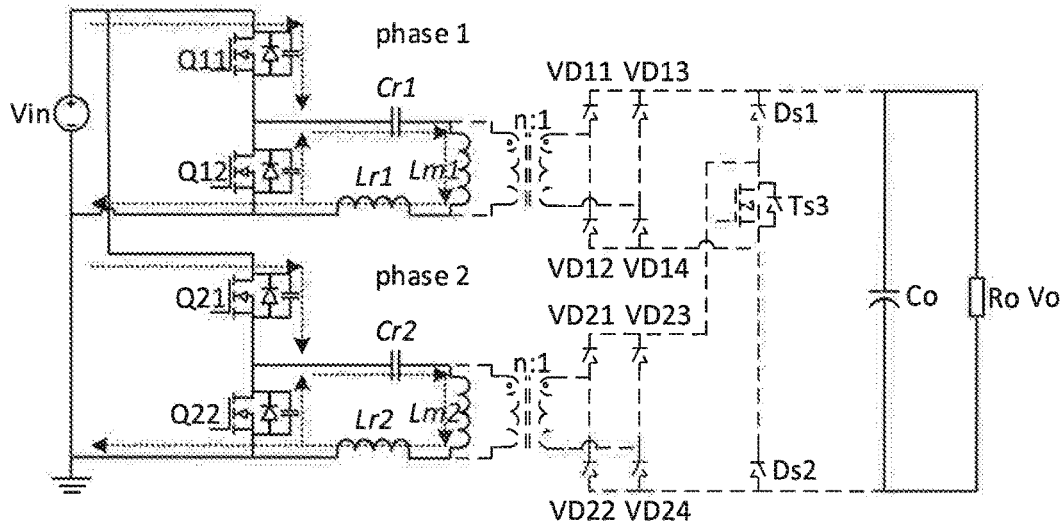

Mode D: As shown in FIG. 7D, Q11, Q12, Q21 and Q22 are off. The capacitors of Q11 and Q21 are charged and the capacitors of Q12 and Q22 are discharged. This mode ends when the drain-source voltages of Q12 and Q22 decrease to zero.

Figure 7E:
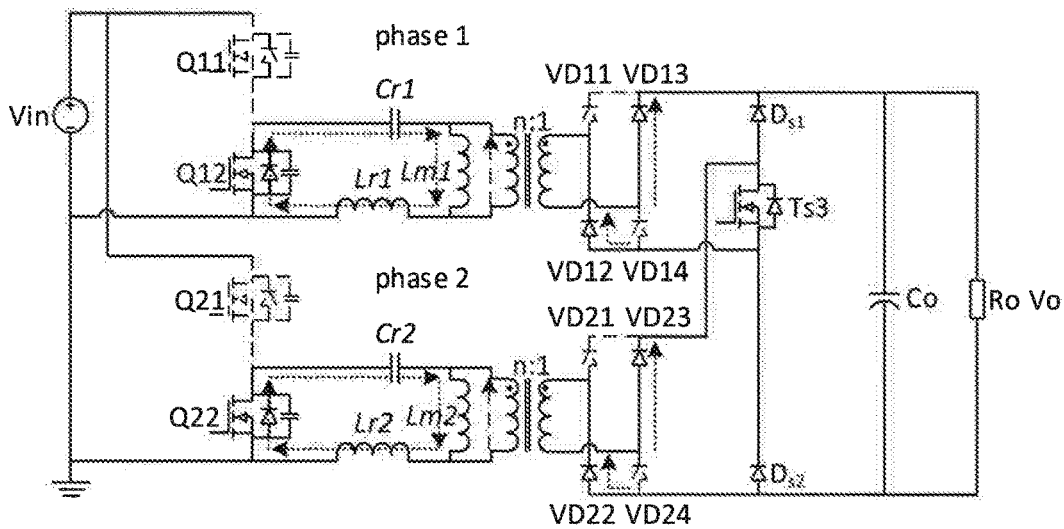

Mode E: As shown in FIG. 7E, Q11 and Q21 are off, and Q12 and Q22 are on. This mode starts when Q12 and Q22 turn on. Q11 and Q21 remain off. Current is delivered from the body diode of switch Q12 and the body diode of switch Q22 as the inductor current $i_{lr1}$ and $i_{lr2}$ are positive. The inductor $L_{m1}$ and capacitor $C_{r1}$ form series resonance, the same as the inductor $L_{m2}$ and capacitor $C_{r2}$. Rectifier current flows through VD12, VD13, VD22 and VD23. This mode ends when $i_{cr1}=0$, $i_{cr2}=0$.

Figure 7F:
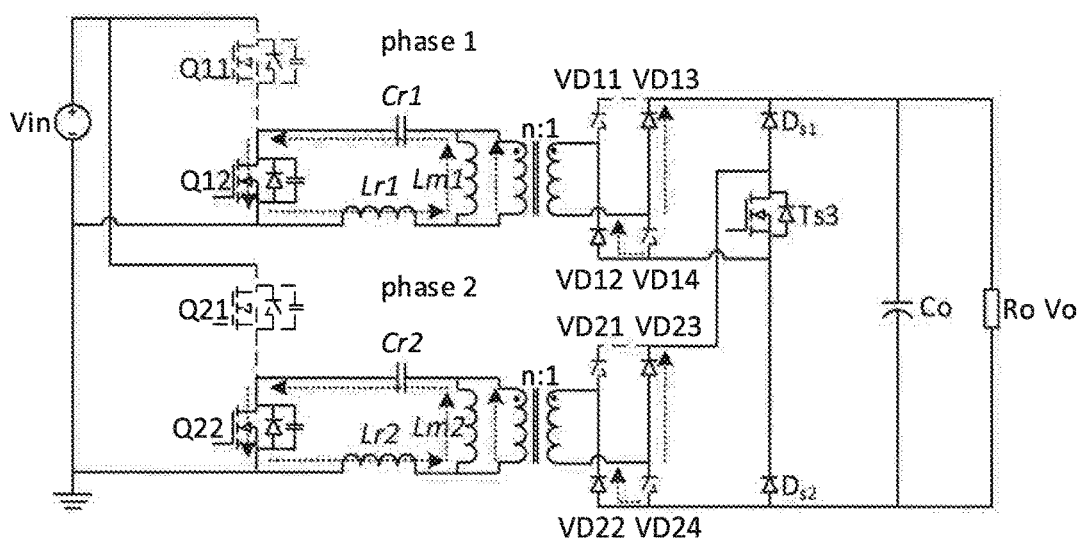

Mode F: As shown in FIG. 7F, Q11 and Q21 are off, and Q12 and Q22 are on. The switches Q12 and Q22 achieve ZVS performance. The drain voltages of Q11 and Q21 equal Vin. The inductor current $i_{lr1}$ and $i_{lr2}$ become positive. The inductor $L_{m1}$ and capacitor $C_{r1}$ form series resonance, the same as the inductor $L_{m2}$ and capacitance $C_{r2}$. VD12, VD13, VD22 and VD23 are on. The currents in magnetizing inductor $L_{m1}$ and magnetizing inductor $L_{m2}$ decrease as the voltages of magnetizing inductors are clamped by output voltage. This mode ends when $i_{cr1}=i_{lm1}$, $i_{cr2}=i_{lm2}$.

Figure 7G:
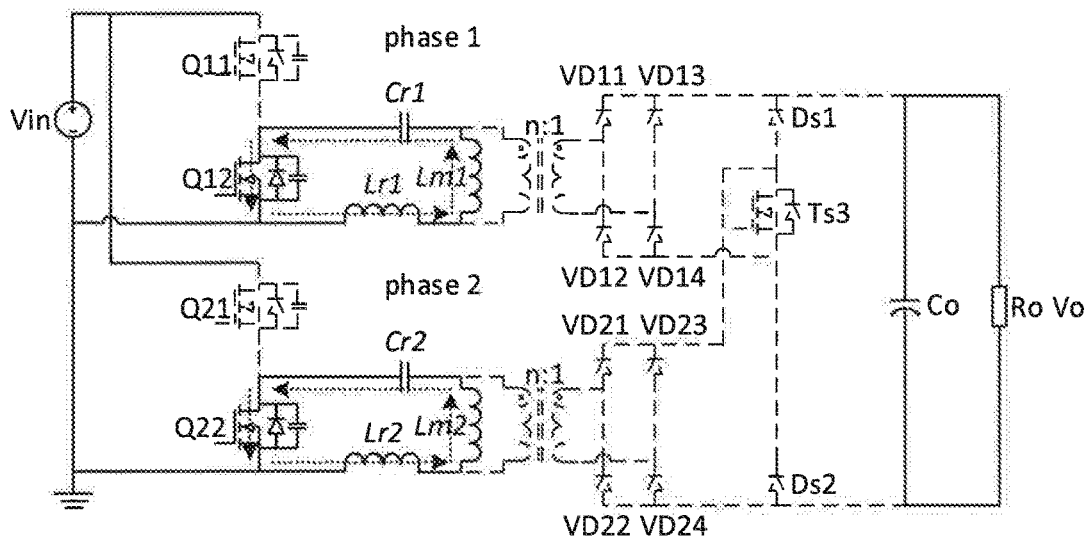

Mode G: As shown in FIG. 7G, Q11 and Q21 are off, and Q12 and Q22 are on. When $i_{cr1}=i_{lm1}$, $i_{cr2}=i_{lm2}$, ZCS performance is achieved for VD12, VD13, VD22 and VD23. There is no power transferred from primary side to secondary side. The voltages of the magnetizing inductors are no longer clamped by output voltage. The resonant current flows into magnetizing inductor $L_{m1}$ and magnetizing inductor $L_{m2}$.

Figure 7H:
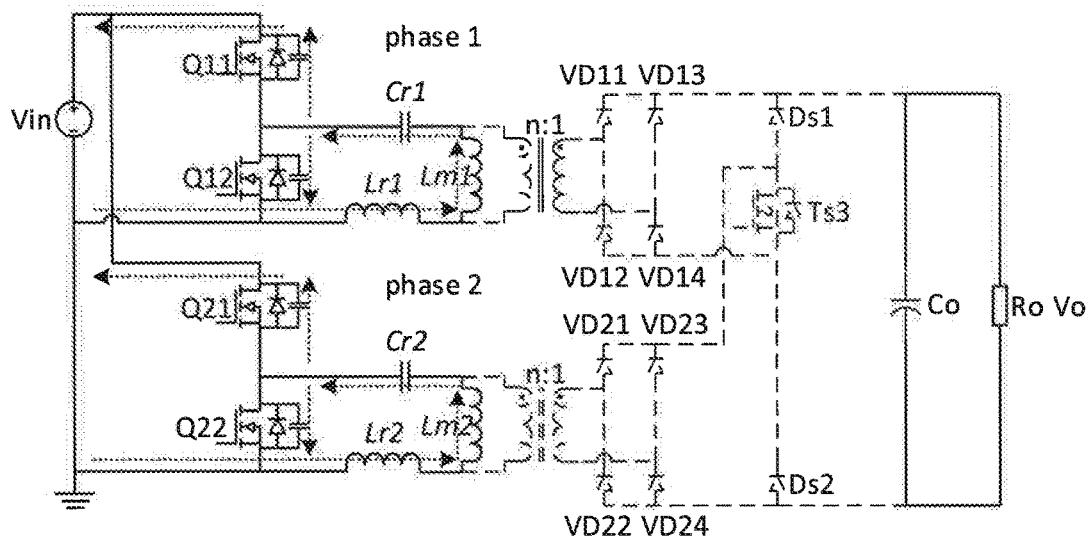

Mode H: As shown in FIG. 7H, Q11, Q12, Q21 and Q22 are off. The capacitors of Q12 and Q22 are charged and the capacitors of Q11 and Q21 are discharged. This mode ends when the drain-source voltages of Q11 and Q21 decrease to zero.

It is observed from the above description that the operation of each phase is relatively independent. Each phase produces a voltage at the output of the rectifier bridge and the two voltages are added together to produce the output voltage across Co. Therefore, the output voltage, Vo, is two times the output voltage of each phase.

Figure 8:
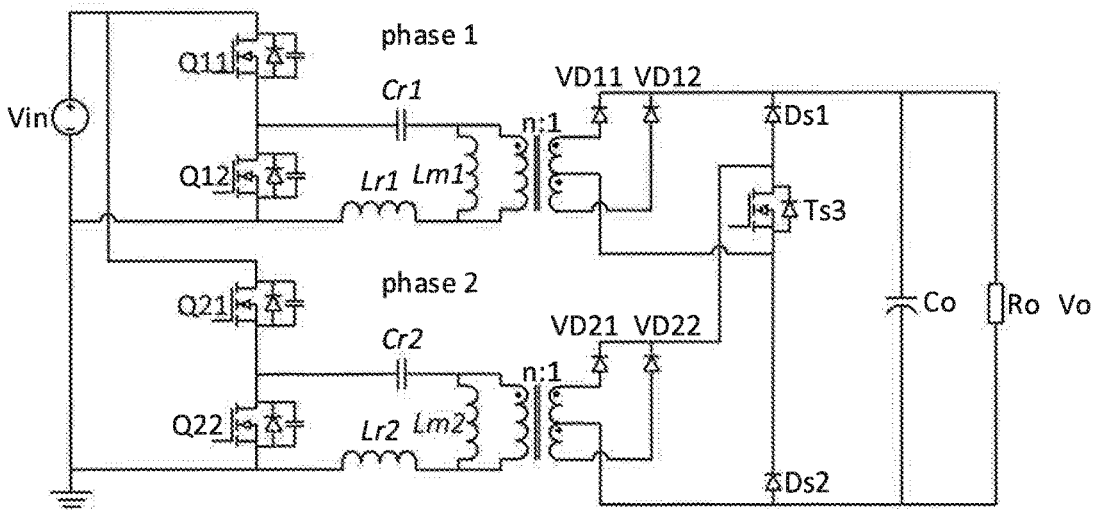
FIG. 8 is a schematic diagram showing secondary sides of a resonant converters implemented with center-tapped windings and rectifiers, according to another embodiment.

FIG. 8 shows another embodiment in which the secondary sides of the resonant converters are implemented with center-tapped windings and rectifiers, and a selection circuit including a switch Ts3 and diodes Ds1 and Ds2. Operation is similar to the embodiment of FIG. 4. The secondary sides of the two phases are in parallel when the switch Ts3 is off, and in series (voltage doubler mode) when the switch Ts3 is on. It is noted that the turns ratio of the two secondary windings of the center-tapped transformers are the same.

Figure 9:
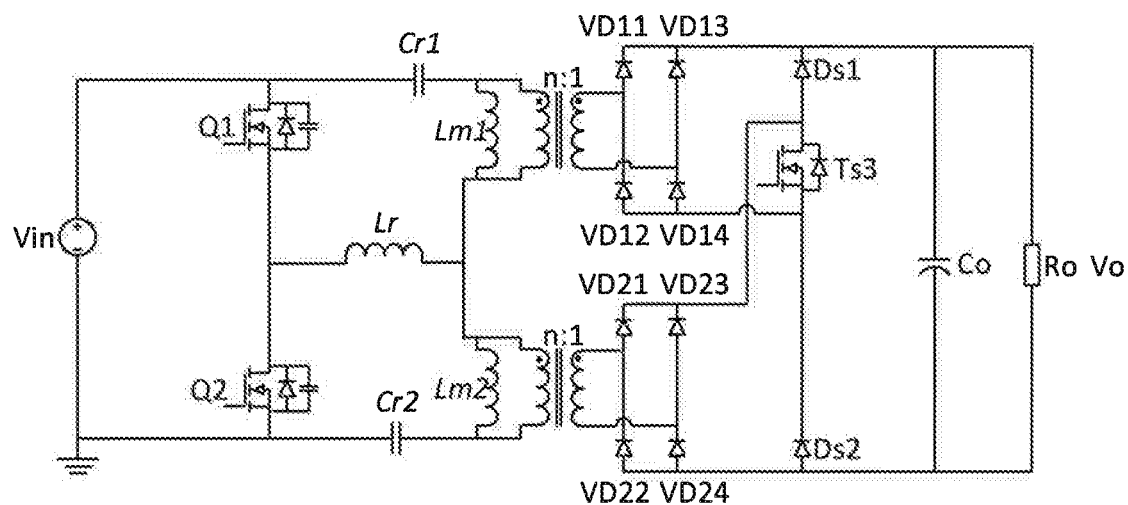
FIG. 9 is a schematic diagram showing primary sides of a resonant converter implemented with two common switches, according to another embodiment.

FIG. 9 shows another embodiment in which the primary sides of the resonant converters are implemented with two common switches Q1 and Q2, and the secondary sides are implemented with full-bridge rectifiers. This embodiment includes a selection circuit with switch Ts3 and diodes Ds1 and Ds2. Again, when Ts3 is turned on, the converter operates in voltage doubler mode. When Ts3 is not turned on (off), the converter operates in non-voltage doubler mode. There are eight working modes (I-VIII) as shown in FIGS. 10A-10H. The embodiment may operate according to working modes I-VIII when the selection circuit is in non-voltage double mode (Ts3 is off), or in voltage doubler mode (Ts3 is on).

Figure 10A:
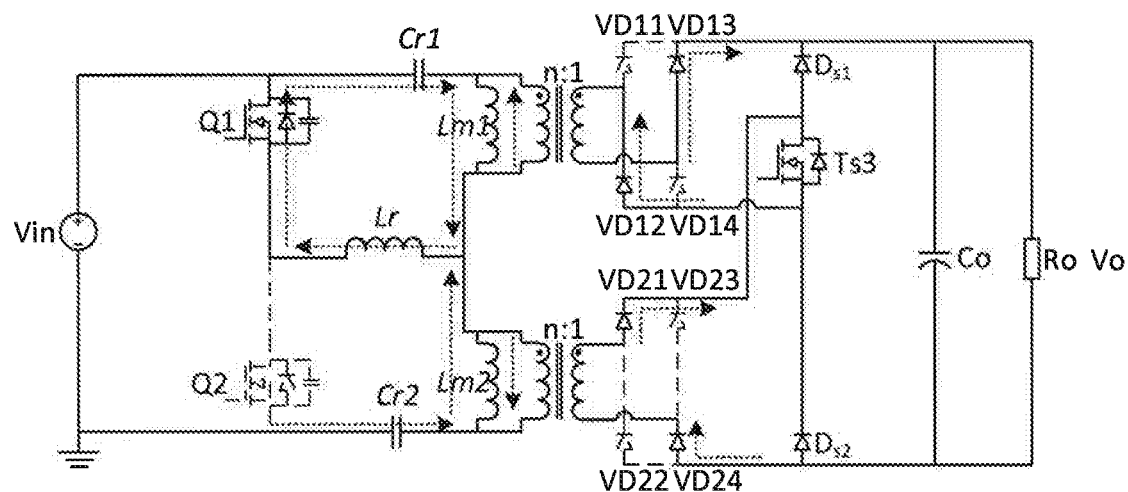
FIGS. 10A-10H are schematic diagrams showing working modes I-VIII of the circuit of FIG. 9, according to one embodiment.

Mode I: As shown in FIG. 10A, Q1 is on, and Q2 is off. This mode starts when Q1 turns on. Q2 remains off. The body diode of Q1 is on as the inductor current $i_{lr}$ is negative. The drain voltage of Q2 equals Vin and the voltage across Q1 is zero. The voltages of magnetizing inductors are clamped by output voltage as VD12, VD13, VD21 and VD24 are on to flow rectifier current. This mode ends when $i_{lr}=0$. Power is transferred from primary side to secondary side.

Figure 10B:
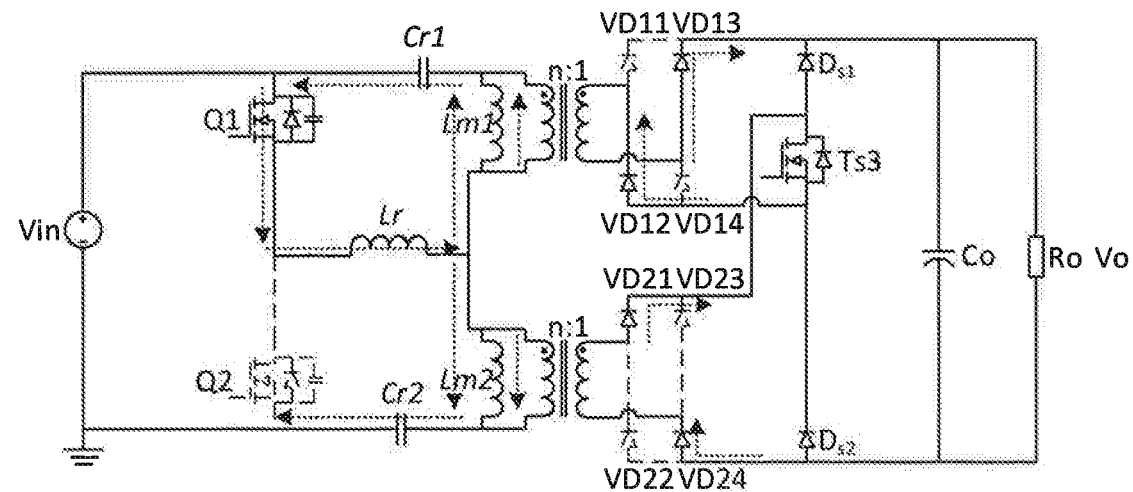

Mode II: As shown in FIG. 10B, Q1 is on, and Q2 is off. ZVS performance is achieved for the switch Q1. The inductor current $i_{lr}$ becomes positive. VD12, VD13, VD21 and VD24 remain on. The voltages of magnetizing inductors are clamped by output voltage, so the currents in magnetizing inductor $L_{m1}$ and the $L_{m2}$ decrease. This mode ends when $i_{cr1}=i_{lm1}$, $i_{cr2}=i_{lm2}$.

Figure 10C:
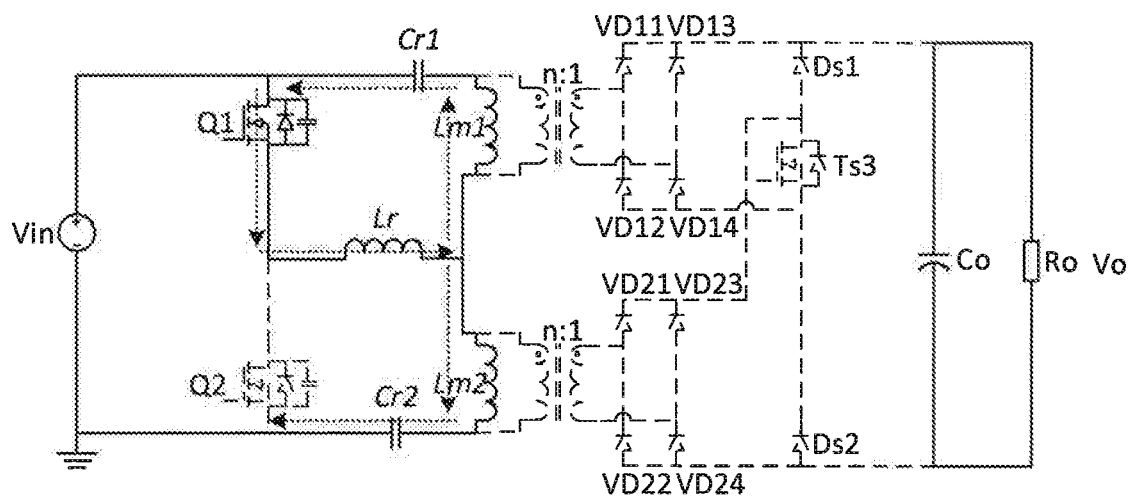

Mode III: As shown in FIG. 10C, Q1 is on, and Q2 is off. As $i_{cr1}=i_{lm1}$, $i_{cr2}=i_{lm2}$, VD12, VD13, VD21 and VD24 achieve ZCS performance. There is no power transferred from primary side to secondary side. The voltages of magnetizing inductors are no longer clamped by output voltage. The resonant current flows into the magnetizing inductors $L_{m1}$ and $L_{m2}$.

Figure 10D:
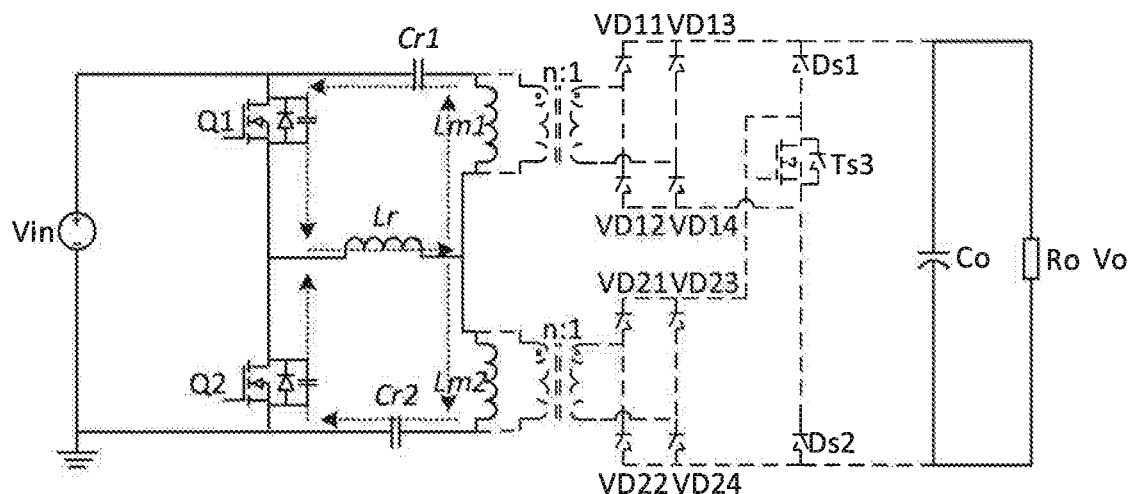

Mode IV: As shown in FIG. 10D, both Q1 and Q2 are off. This mode starts when Q1 turns off. The parasitic capacitor of Q1 is charged and the parasitic capacitor of Q2 is discharged. This mode ends when the drain-source voltage of Q1 increases to Vin.

Figure 10E:
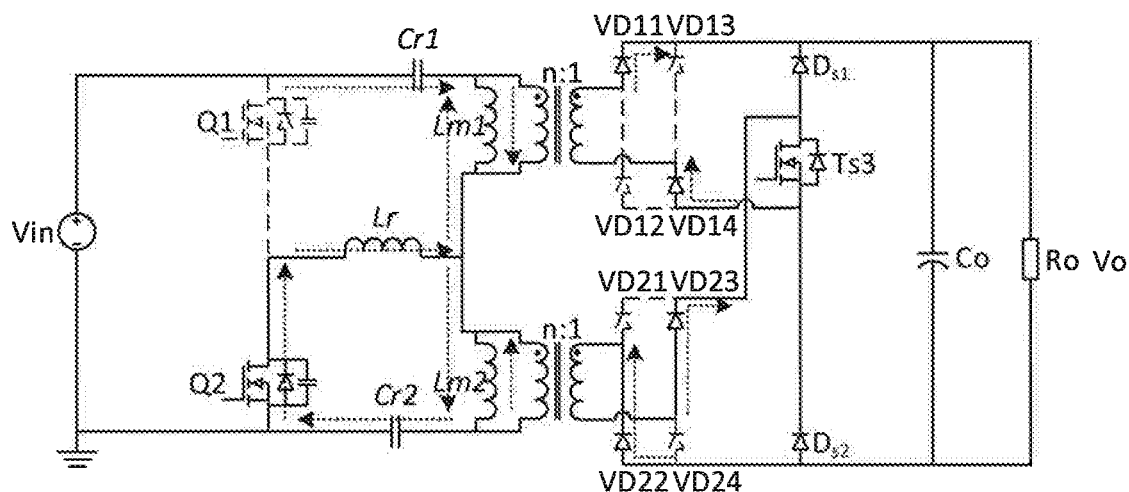

Mode V: As shown in FIG. 10E, Q1 is off, and Q2 is on. This mode starts when Q2 turns on. Q1 remains off. The body diode of Q2 is on, because the inductor current $i_{lr}$ is positive. The drain voltage of Q1 equals Vin and the voltage across Q2 is zero. VD11, VD14, VD22 and VD23 are on to flow rectifier current, so the voltages of the magnetizing inductors are clamped by output voltage. This mode ends when $i_{lr1}=0$. Power is transferred from primary side to secondary side.

Figure 10F:
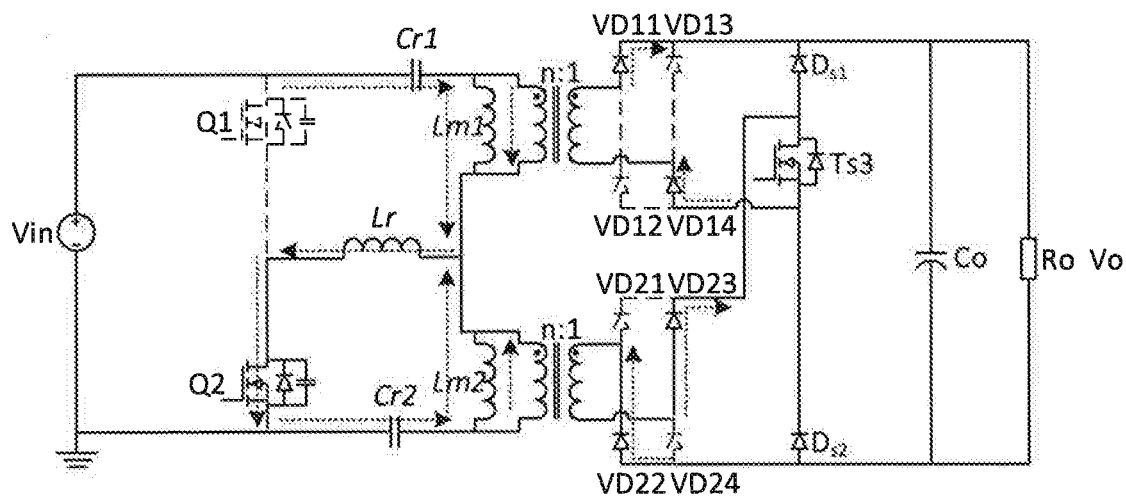

Mode VI: As shown in FIG. 10F, Q1 is off, and Q2 is on. The switch Q1 achieves ZVS performance. The inductor current $l_{lr}$ becomes negative. VD11, VD14, VD22 and VD23 remain on. The voltages of the magnetizing inductors are clamped by output voltage, so the current in magnetizing inductor $L_{m1}$ and magnetizing inductor $L_{m2}$ increases. This mode ends when $i_{cr2}=i_{lm1}$, $i_{cr2}=i_{lm2}$.

Figure 10G:
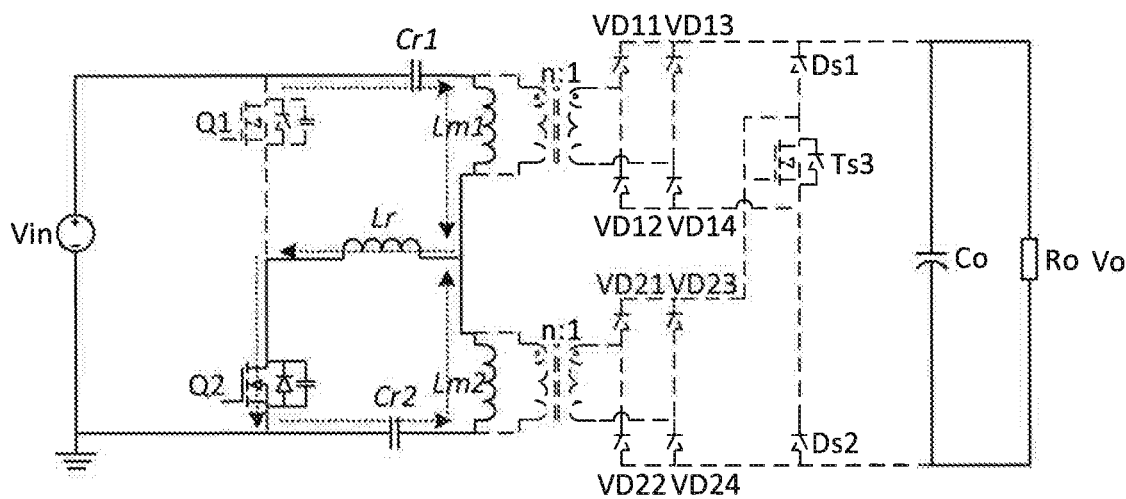

Mode VII: As shown in FIG. 10G, Q1 is off, and Q2 is on. As $i_{cr1}=i_{lm1}$, $i_{cr2}=i_{lm2}$, ZVS performance are achieved for VD11, VD14, VD22 and VD23. There is no power transferred from primary side to secondary side. The voltages of the magnetizing inductors are no longer clamped by output voltage. The resonant current flows into the magnetizing inductors $L_{m1}$ and $L_{m2}$.

Figure 10H:
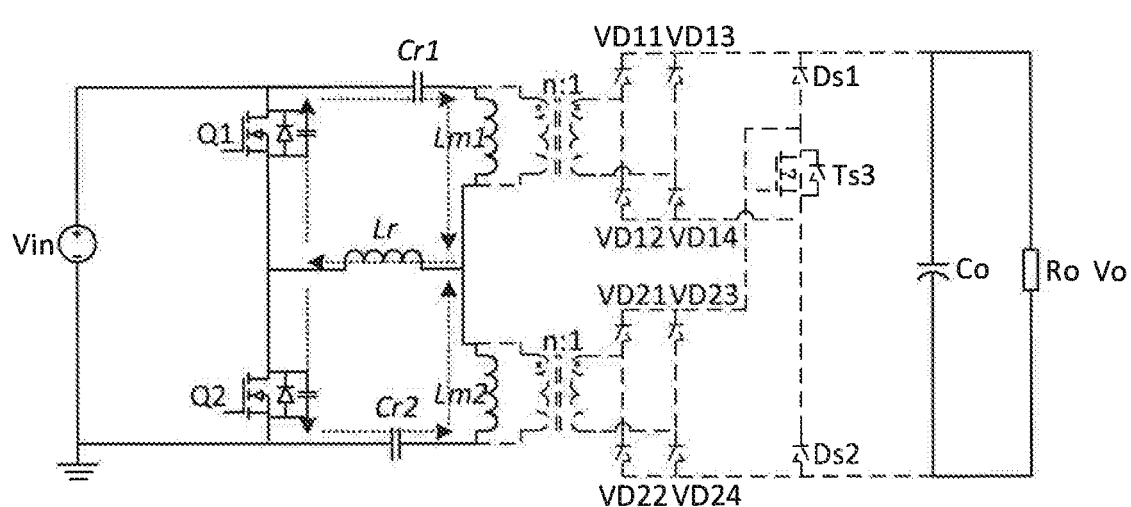

Mode VIII: As shown in FIG. 10H, both Q1 and Q2 are off. This mode starts when Q2 turns off. The parasitic capacitor of Q1 is discharged and the parasitic capacitor of Q2 is charged. This mode ends when the drain-source voltage of Q1 decreases to zero.

Figure 11:
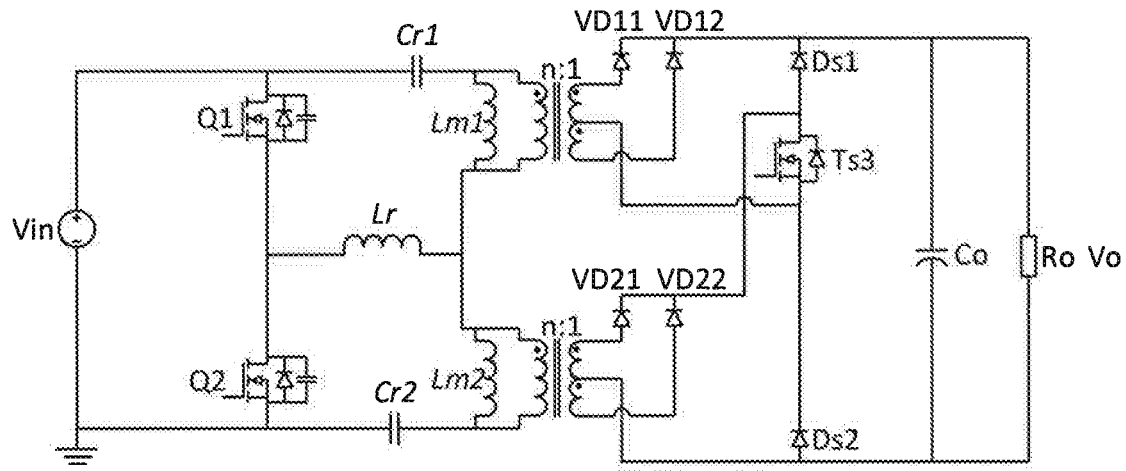
FIG. 11 is a schematic diagram showing primary sides of a resonant converter implemented with two common switches and secondary sides implemented with center-tapped windings, according to one embodiment.

FIG. 11 shows another embodiment in which the primary sides of the resonant converter are implemented with two common switches Q1 and Q2, and the secondary sides are implemented with center-tapped windings. This embodiment includes a selection circuit with switch Ts3 and diodes Ds1 and Ds2. The operation is similar to circuit shown in FIG. 9.

Figure 12A:
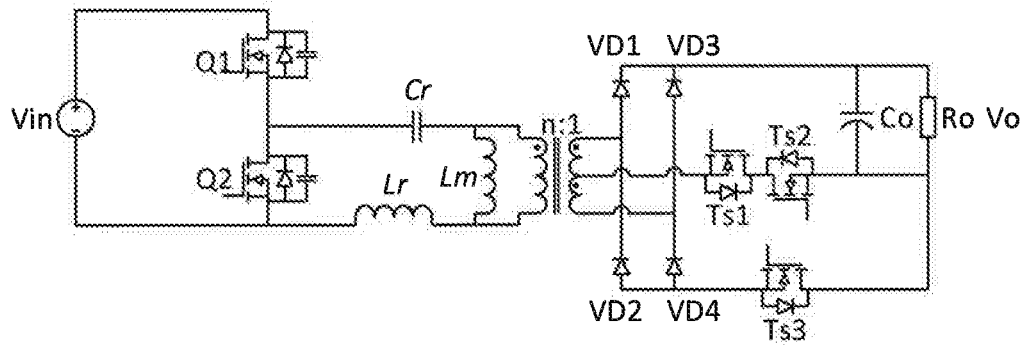
FIG. 12A is a schematic diagram showing a resonant converter with center-tapped secondary winding, according to one embodiment.
Figure 12B:
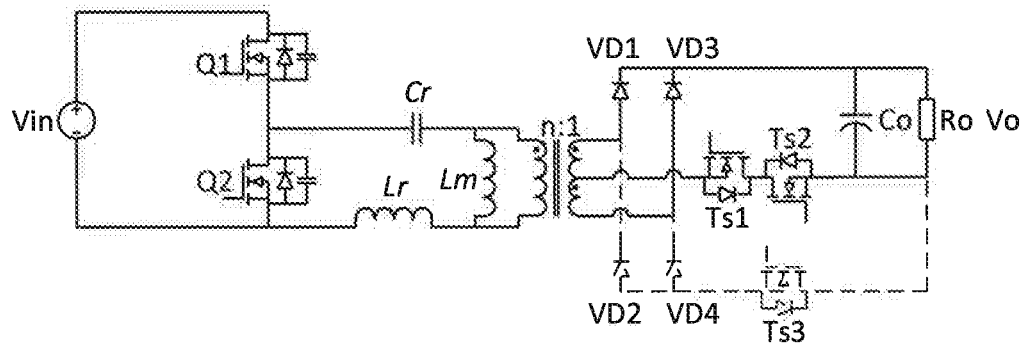
FIGS. 12B and 12C are schematic diagrams showing operation of the embodiment of FIG. 12A, according to two modes.
Figure 12C:
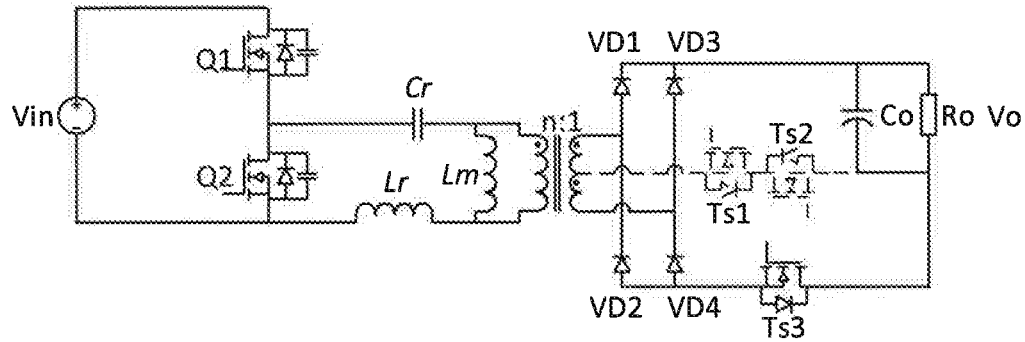
Figure 13:
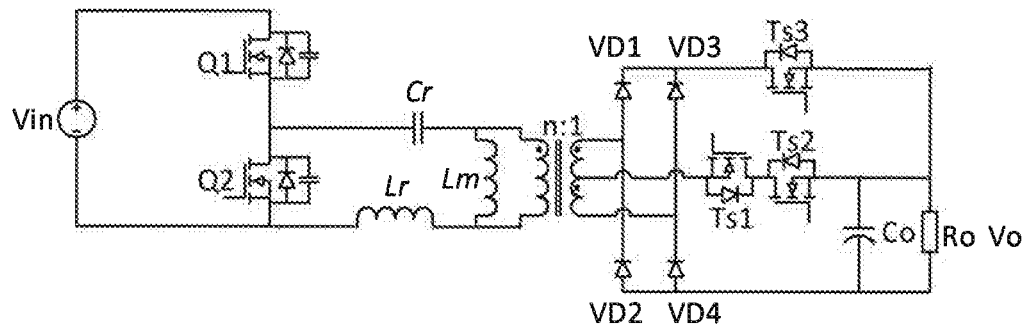
FIG. 13 is a schematic diagram showing a resonant converter with center-tapped secondary winding, according to another embodiment.

FIG. 12A shows an embodiment based on a single phase LLC resonant converter with center-tapped secondary winding, and a four-diode rectifier. The turns ratio of each half of the center-tapped secondary winding is n:1, i.e., the number of turns of the secondary windings is same. In this embodiment the secondary side selection circuit includes three switches Ts1, Ts2 and Ts3. As shown in FIG. 12B, when switches Ts1, Ts2 are on and Ts3 is off, the circuit operates in non-voltage doubler mode. FIG. 12C shows operation in voltage doubler mode, wherein Ts1, Ts2 are off and Ts3 is on. In this mode the center tap of the transformer is not used, and the turns ratio of the transformer is effectively n:2. An alternative arrangement of this embodiment is shown in FIG. 13, wherein the output voltage is connected to the ground of the secondary side.

Figure 14:
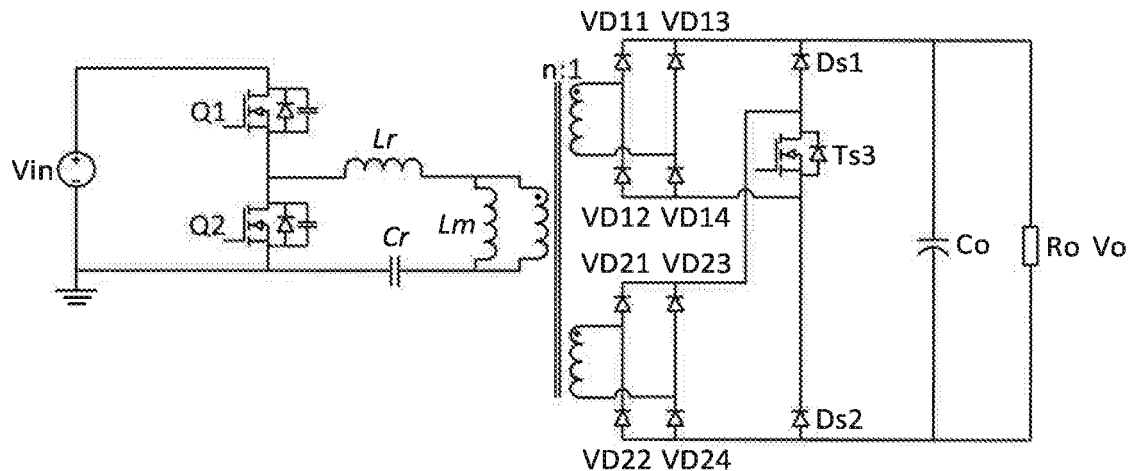
FIG. 14 is a schematic diagram showing a resonant converter with secondary windings connected to full-bridge rectifiers, according to one embodiment.
Figure 15A:
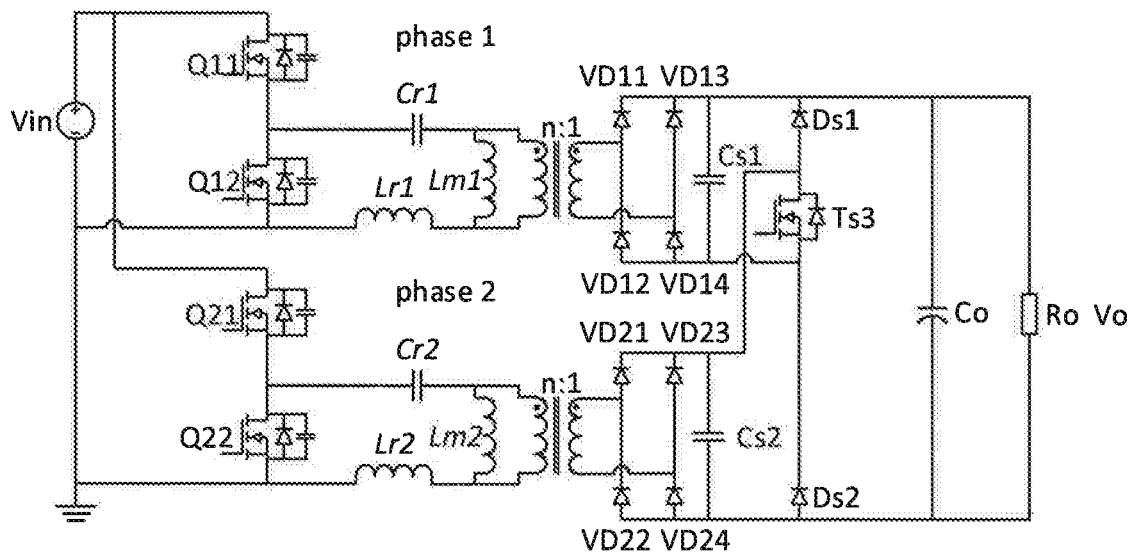
FIGS. 15A-15E are schematic diagrams showing resonant converters with additional secondary-side capacitors Cs1 and Cs2, according to further embodiments.
Figure 15B:
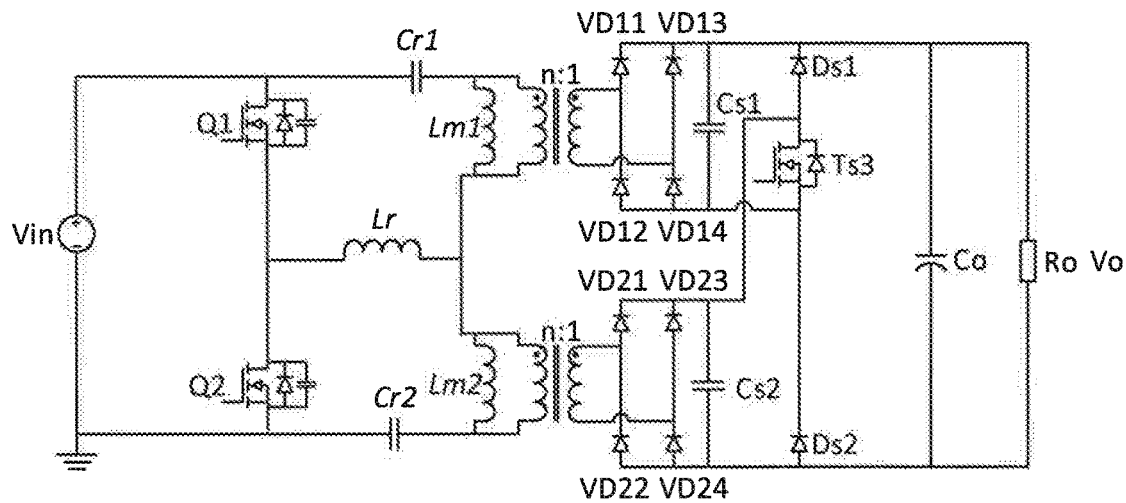
Figure 15C:
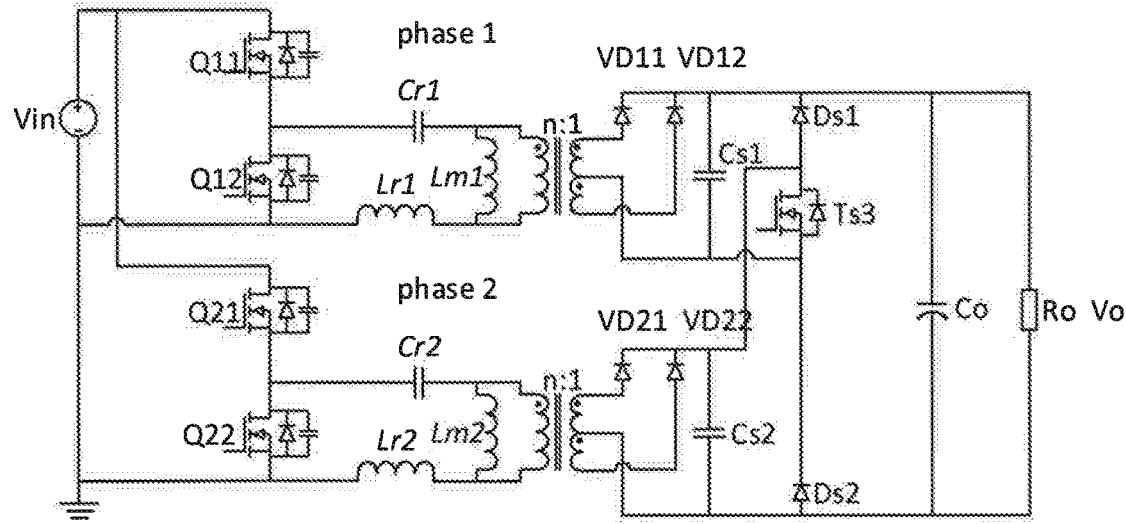
Figure 15D:
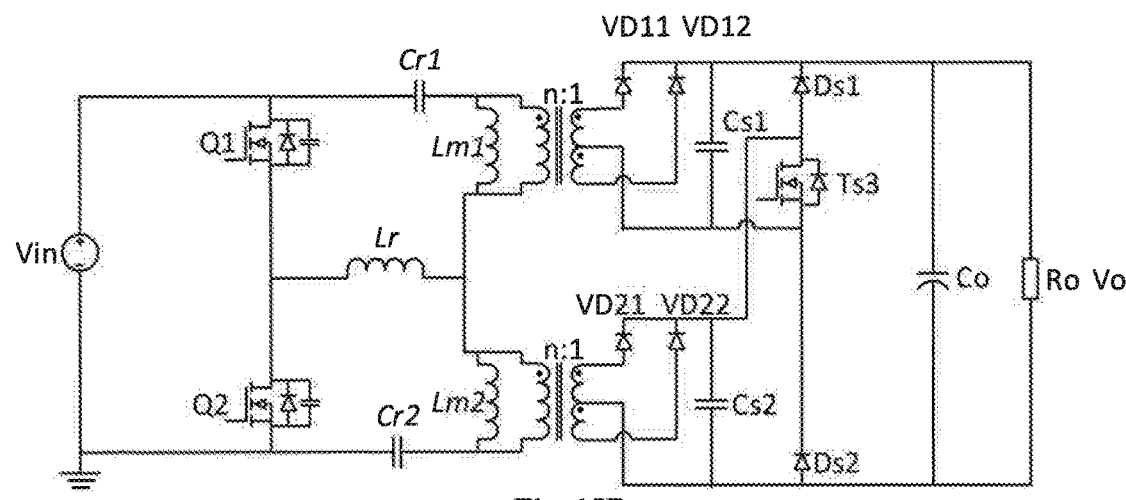
Figure 15E:
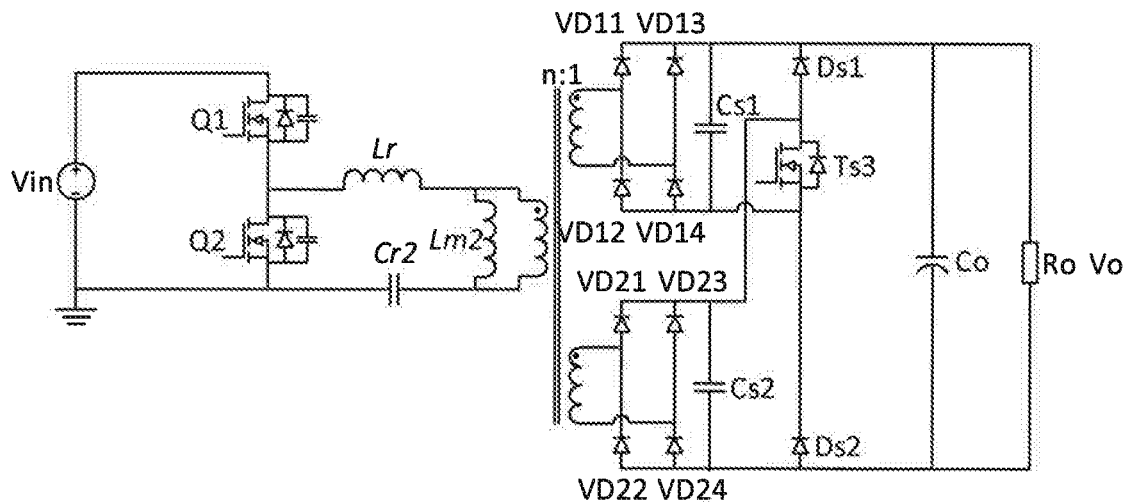

FIG. 14 shows a further embodiment implemented with one primary side winding and two secondary windings, wherein each secondary winding in connected to a full-bridge rectifier. The selection circuit include switch Ts3 and diodes Ds1 and Ds2, and operates as described above to provide voltage doubler and non-voltage doubler modes. When Ts3 is turned on, the circuit operates in voltage doubler mode. When Ts3 is turned off, the circuit operates in non-voltage doubler mode.

In practical applications where the two resonant converter phases may not be identical, capacitors may optionally be added to provide voltage equalization between the two rectifier bridges. FIGS. 15A-15E show embodiments with such additional capacitors Cs1 and Cs2, wherein (Cs1=Cs2<<Co). Accordingly, voltage equalization may be achieved between the two rectifier bridges using such small capacitors when the operating modes are changed between parallel operation and series operation. Cs1 and Cs2 are small (much smaller than the value of the output capacitor, Co) and they are used to absorb voltage spikes caused by (1) parasitic inductance of the transformer and PCB track, (2) parameter unbalance between the two phases, and/or (3) other non-ideal cases of the circuit. The value of Cs1 and Cs2 may be, for example, about 0.01 uF to 1 uF for output power of about 60 W (e.g., 20V, 3 A), whereas the values of Co may be, for example, 100 uF. The value of Co is selected based on the output voltage ripple and deviation requirement for transient response.

When the LLC resonant phases are connected in series, the output capacitance Co is equivalent to the series connection of two equal capacitances Co/2, and its virtual midpoint is virtually connected to the midpoints of Cs1 and Cs2. When the two capacitors are connected in parallel, the instantaneous voltage is equal to the voltage across Co/2 as Co/2 is much larger than Cs1.

In the above description, a half bridge LLC resonant converter is used as an example to illustrate the basic operation of the voltage doubler circuit. When a full bridge LLC resonant converter is used, the voltage doubler circuit operates in same way. When other type of resonant converters are used, such as a series resonant converter (SRC), the selection circuit also operates the same way to achieve voltage doubler operation. It is noted that the outputs of the SRC and LLC are considered to be current sources.

One or more controller may be included with any of the embodiments to control operation of resonant converter switches (Q11, Q12, Q21, Q22, or Q1, Q2) and/or selection circuit switches Ts3 or Ts1-Ts3), in order to produce and select the working modes (modes A-H or modes I-VIII) described above, and to select and control operation in voltage doubler and non-voltage doubler modes. The one or more controller may be analog or digital and include gate drivers and logic circuitry and be implemented in any suitable technology as known in the art, such as, but not limited to, a field programmable gate array (FPGA).

3. Applications

It will be appreciated that embodiments described herein, and variations thereof, are suitable for applications requiring wide input voltage and output voltage ranges. For example, applications may include power delivery for low-voltage personal electronic devices such as cell phones, tablets, and laptop computers. Since the embodiments can provide a range of output voltage ranges to accommodate such devices, a single power delivery device may be used for all such devices.

Embodiments are also well-suited to high-voltage applications such as electric vehicle (EV) charging. Since the embodiments can provide a wide range of output voltages, a single embodiment can accommodate different voltages required for different types of EVs (e.g., cars may require lower voltages than large vehicles such as trucks and buses).

Further, embodiments can accommodate a wide range of input voltages as may be determined by location (due to, for example, different line voltages such as 110-120 VAC in North America and 220-240 VAC in Europe) while maintaining the wide output voltage range.

Equivalents

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A resonant converter, comprising:
   first and second primary side input terminals;
   at least five primary side switches;
   two or more primary side resonant circuits;
   a transformer;
   at least one secondary side rectifier circuit;
   output points of the at least one rectifier circuit connected to first and second secondary side output terminals;
   an output capacitor connected across the first and second output terminals; and
   at least one controller that controls the at least five primary side switches according to at least two modes of operation of the primary side;
   wherein only two switches of the at least five primary side switches are connected together in a back to back configuration and the two switches are switched on and off together;
   wherein each mode of the at least two modes is associated with a voltage at the first and second output terminals;

wherein each mode of the at least two modes requires operation of the two or more primary side resonant circuits;

wherein at least a first selected mode of operation of the primary side determines a voltage V at the first and second output terminals and at least a second selected mode of operation of the primary side determines a voltage 2V at the first and second output terminals.

2. The resonant converter of claim 1, wherein the at least one controller controls the at least five switches according to eight working modes.

3. The resonant converter of claim 2, wherein a first four working modes determine the voltage 2V at the first and second output terminals and a second four working modes determine the voltage V at the first and second output terminals.

4. A method for controlling a resonant converter comprising:
   first and second primary side input terminals;
   at least five primary side switches;
   two or more primary side resonant circuits;
   a transformer;
   at least one secondary side rectifier circuit;
   output points of the at least one rectifier circuit connected to first and second secondary side output terminals;
   an output capacitor connected across the first and second output terminals;
the method comprising:
   controlling the at least five switches according to at least a first selected mode that determines a voltage V at the first and second output terminals;
   controlling the at least five switches according to at least a second selected mode that determines a voltage 2V at the first and second output terminals;
   wherein each mode of the at least first and second modes requires operation of the two or more primary side resonant circuits;
   wherein only two switches of the at least five primary side switches are connected together in a back to back configuration and are switched on and off together.

5. The method of claim 4, wherein the method comprises controlling the at least five switches according to eight working modes.

6. The method of claim 5, comprising:
   controlling the at least five switches according to a first four working modes that determine the voltage 2V at the first and second output terminals; and
   controlling the at least five switches according to a second four working modes determine the voltage V at the first and second output terminals.

* * * * *